Sept. 18, 1962  G. H. DIMOND  3,054,240
CAPPING EQUIPMENT
Filed Oct. 18, 1960  8 Sheets-Sheet 1
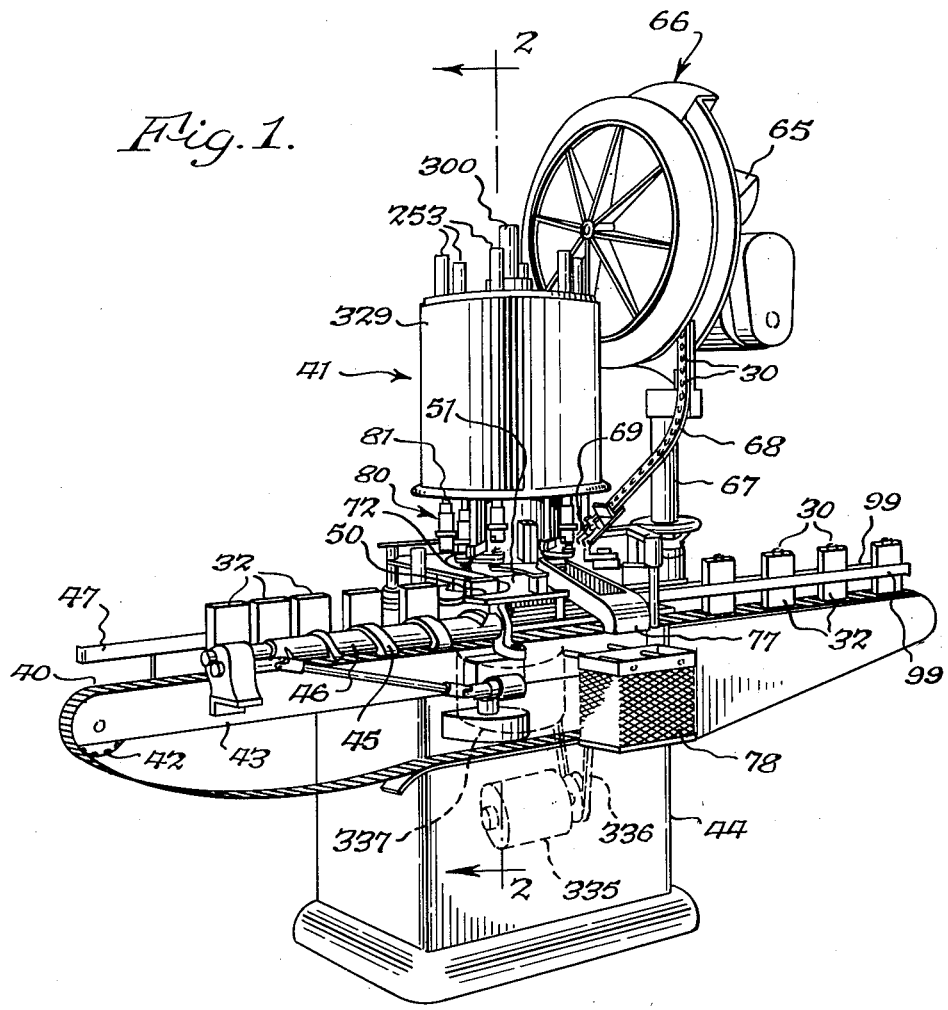
INVENTOR
George H. Dimond
BY Robert S. Sanborn
ATTORNEY

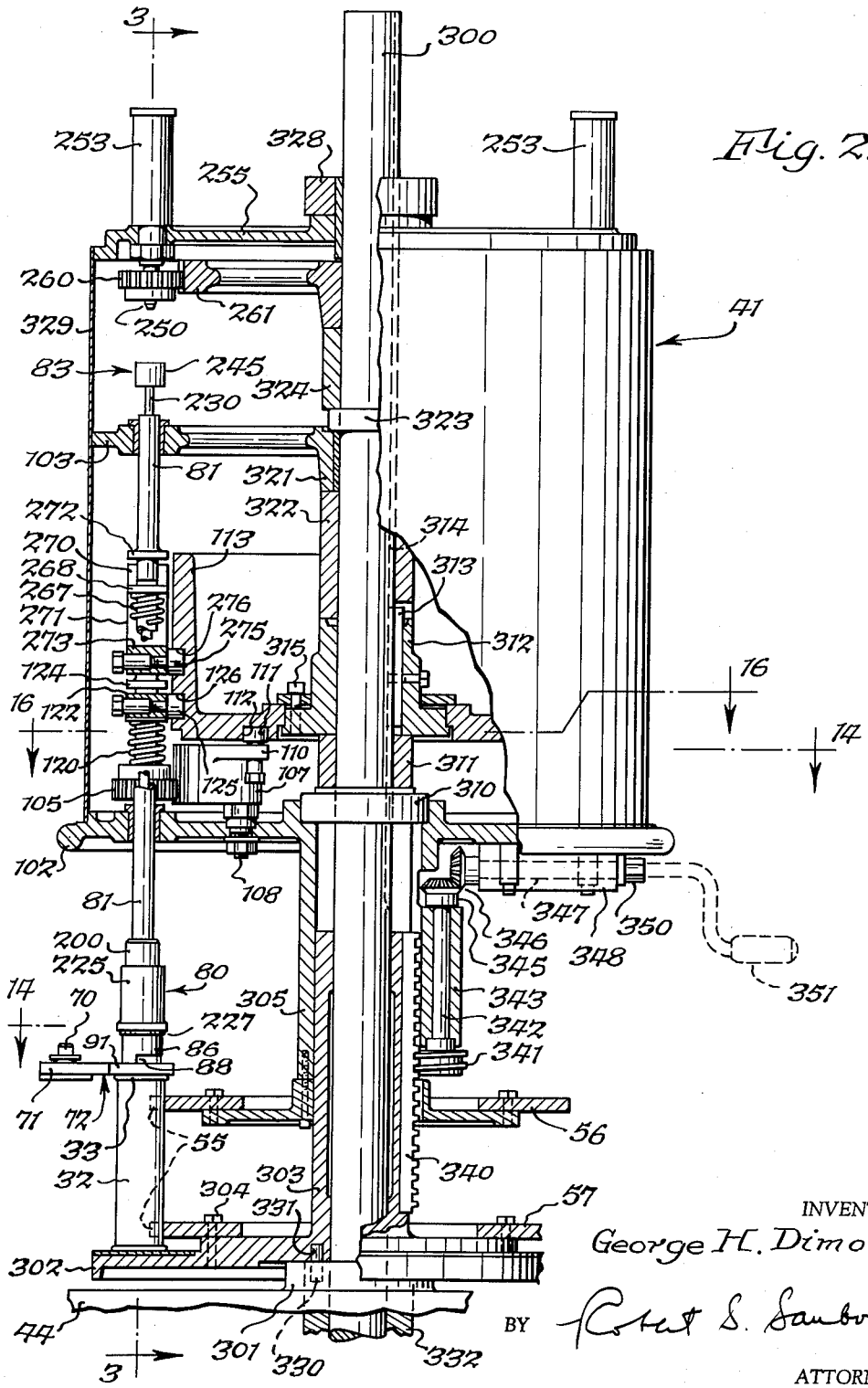

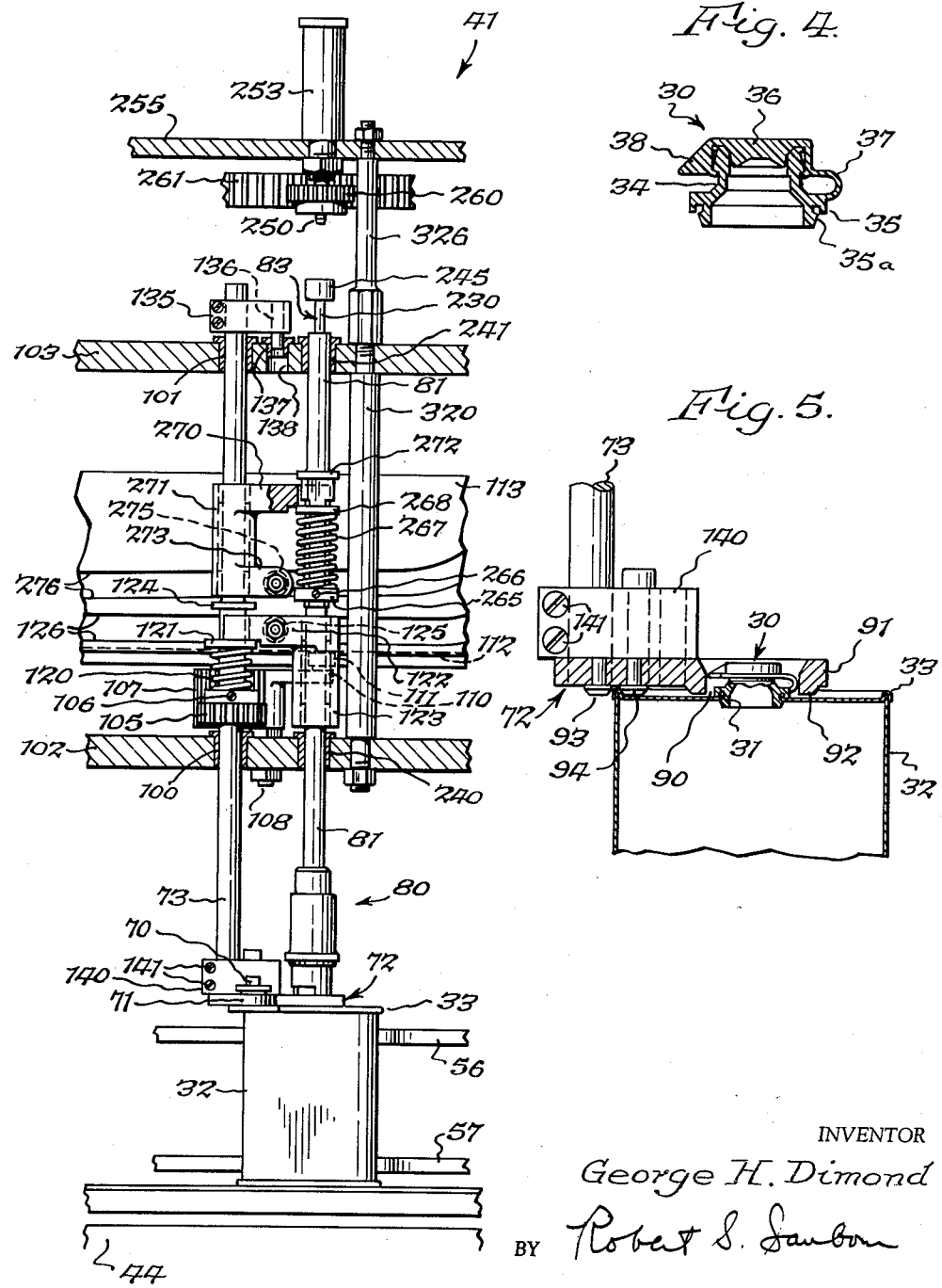

Sept. 18, 1962　　　G. H. DIMOND　　　3,054,240
CAPPING EQUIPMENT
Filed Oct. 18, 1960　　　　　　　　　　　8 Sheets-Sheet 4
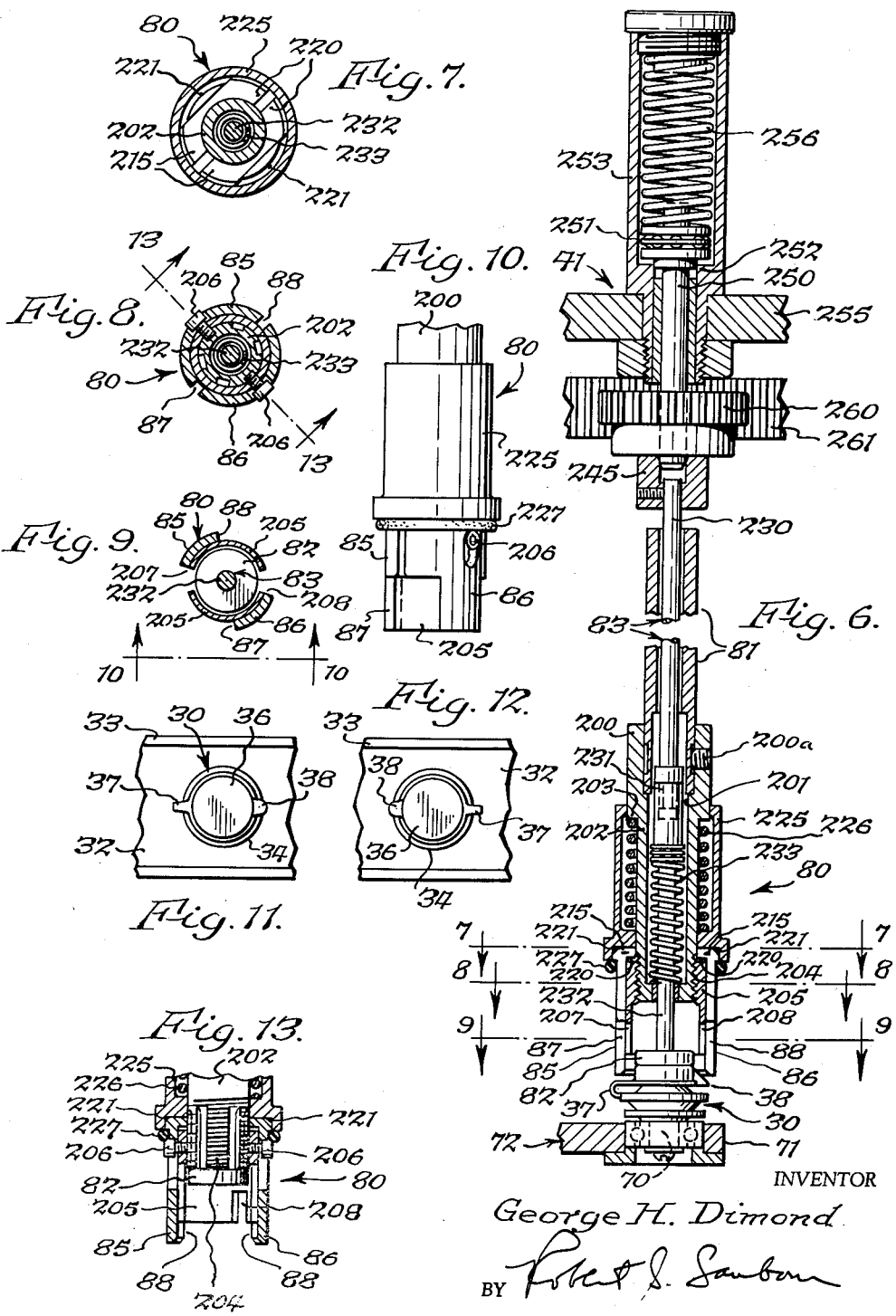
INVENTOR
George H. Dimond
BY
ATTORNEY Sept. 18, 1962

G. H. DIMOND 3,054,240

CAPPING EQUIPMENT

Filed Oct. 18, 1960

INVENTOR
George H. Dimond
BY Robert S. Sanborn
ATTORNEY

Sept. 18, 1962   G. H. DIMOND   3,054,240
CAPPING EQUIPMENT
Filed Oct. 18, 1960   8 Sheets-Sheet 6

INVENTOR
George H. Dimond
BY Robert S. Sanborn
ATTORNEY

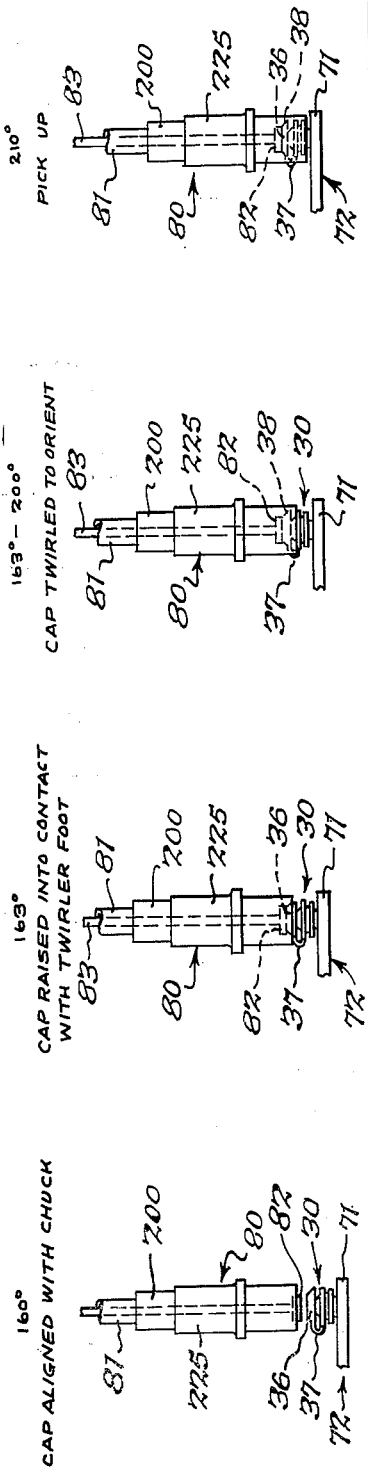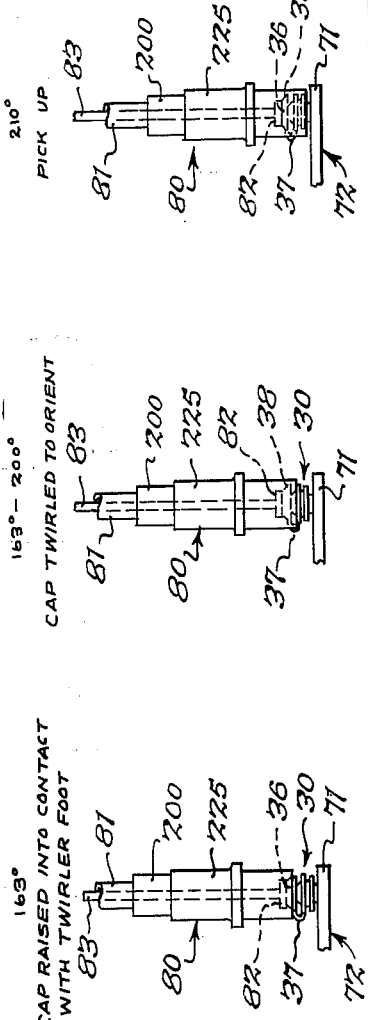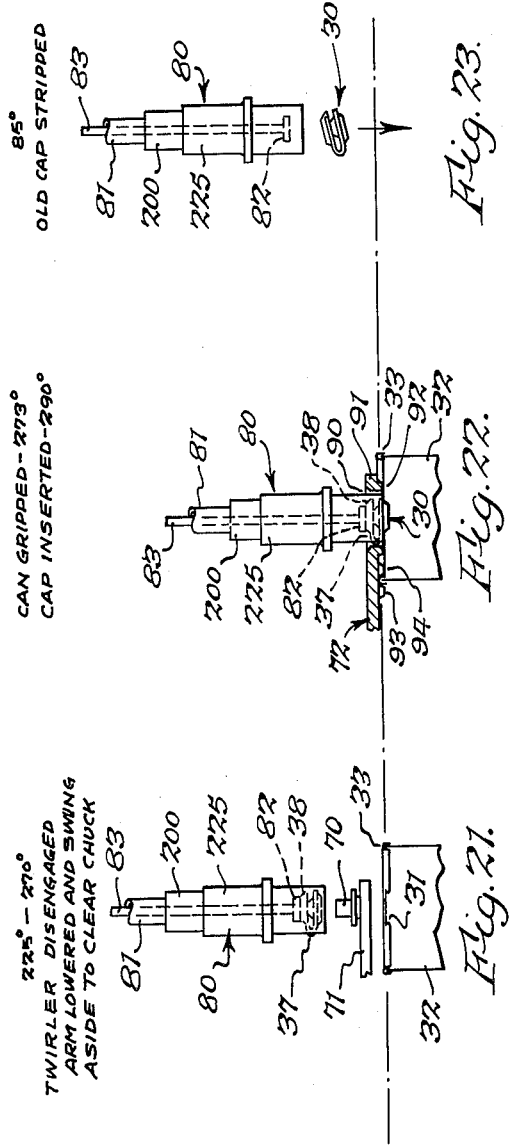

Sept. 18, 1962  G. H. DIMOND  3,054,240
CAPPING EQUIPMENT
Filed Oct. 18, 1960  8 Sheets-Sheet 8
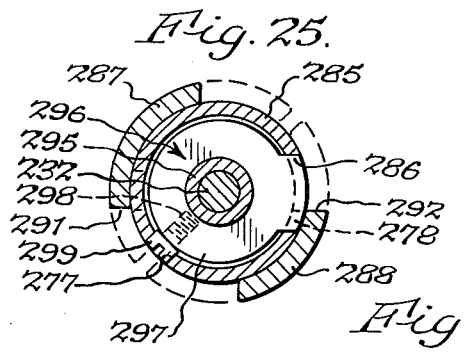
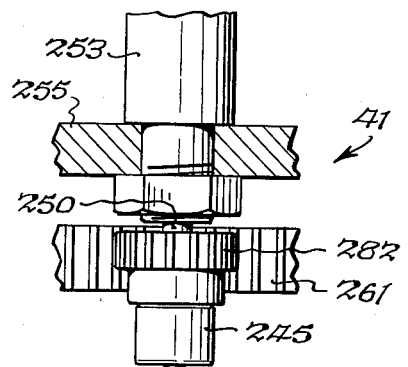
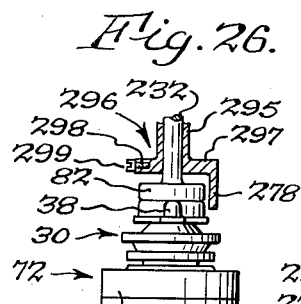
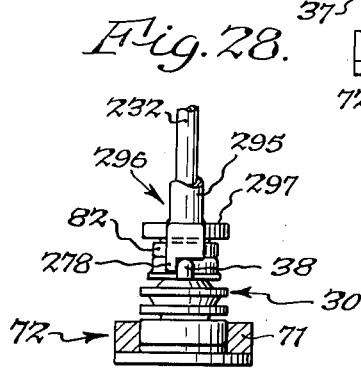
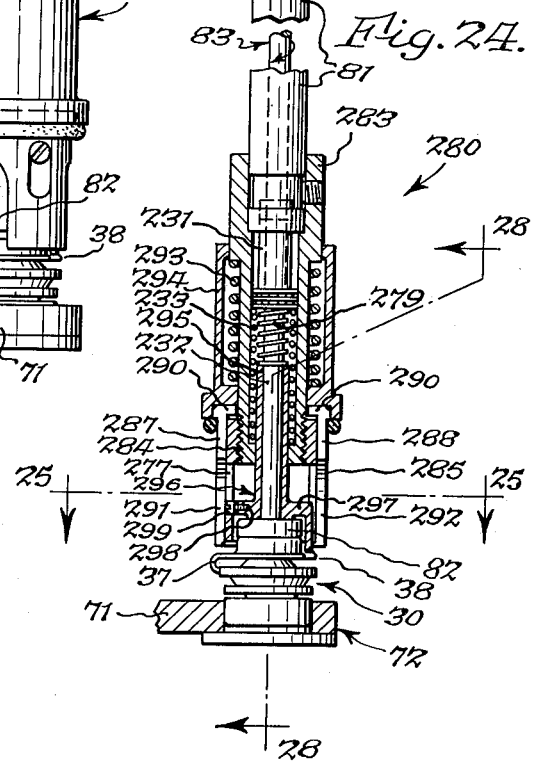
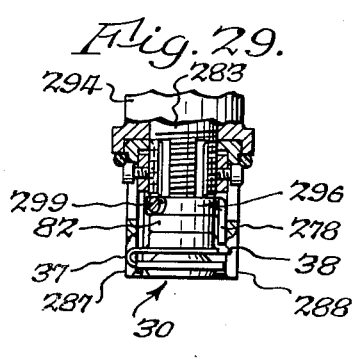
INVENTOR
George H. Dimond
BY Robert S. Sanborn
ATTORNEY United States Patent Office 3,054,240
Patented Sept. 18, 1962

3,054,240
CAPPING EQUIPMENT
George H. Dimond, East Aurora, N.Y., assignor to Consolidated Packaging Machinery Corporation, Buffalo, N.Y., a corporation of New York
Filed Oct. 18, 1960, Ser. No. 63,409
33 Claims. (Cl. 53—308)

This invention relates to a closure machine and more particularly to a machine which is adapted to apply closure elements to a series of containers sequentially advanced through the machine.

Closure machines of the type to which the present invention is directed, while of general application, are particularly suited for effecting closure of a container by means of a cap or other closure element having one or more laterally disposed projections thereon. Thus, for example, such machines illustratively may be used to apply to the container a cap having a pouring spout or plug and a captive snap-on cover which is secured to the plug by means of an integrally formed hinge projecting in a lateral direction therefrom. In addition, the cap often includes a suitable lifting tab which projects laterally from the cap cover in a direction opposite to that of the hinge.

Heretofore, machines previously employed for this purpose have exhibited several disadvantages. For example, it frequently is desirable to orient the caps on the containers in a manner such that the hinge, lifting tab or other projection on each cap is disposed in a predetermined vertical plane with respect to the corresponding container, and many such previous machines have proved deficient in this respect. Additionally, and this has been of special moment in cases in which the containers are continually in motion as the caps are applied thereto, difficulties heretofore were encountered in maintaining each successive container and the cap therefor in proper alignment with each other during the cap applying operation. Furthermore, machines of the type heretofore employed have not been readily adaptable for applying the caps to containers of various sizes.

One general object of this invention, therefore, is to provide a new and improved closure machine which is particularly adaptable for applying caps or other closure elements to a series of containers sequentially advanced through the machine.

More specifically, it is an object of this invention to provide such a machine which is adapted to accurately orient a laterally extending projection on each closure element as it is applied to the corresponding container.

Another object of this invention is to provide a machine of the character indicated in which the containers and closure elements therefor are firmly and positively maintained in vertical alignment with each other during operation of the machine.

A further object of this invention is to provide a closure machine which is adapted to accommodate containers of various sizes.

Still another object of this invention is to provide a closure machine utilizing comparatively simple mechanical elements, which machine is economical to manufacture and thoroughly reliable in operation.

In one illustrative embodiment of this invention, there is provided a machine for automatically applying closure elements to containers which includes a rotary turret for receiving the containers in succession from a supply thereof. A series of cylindrical chucks are mounted around the turret periphery above and in vertical alignment with the containers, and each of these chucks carries a concentric plunger which is rotatably disposed with respect thereto. An element receiving arm member is associated with each of the chucks and is attached to the lower end of a vertically disposed rock shaft mounted on the turret adjacent each chuck. As the turret rotates, successive closure elements are received by the arm members, and each rock shaft is thereupon effective to rotate its arm member in a manner such that the closure element thereon is positioned directly beneath the adjacent chuck. The chuck then moves downwardly to grip the thus positioned closure element, and upon the return of the corresponding arm member to its initial position, the chuck continues its downward movement to firmly position the closure element on the container there-beneath.

In accordance with one feature of the invention, there is provided orienting means of unique construction and arrangement which is effective to position the closure elements in a manner such that a lateral projection on each element gripped by a chuck is disposed in a predetermined vertical plane with respect to the associated container and is maintained in this plane as the element is applied to the container. As an illustration, in one particularly advantageous embodiment, each rock shaft is raised upon rotation of the attached arm member to its position beneath the corresponding chuck in a manner such that the closure element on the arm member frictionally engages the lower end of the plunger carried by the chuck. The plunger is then rotated relative to the chuck to similarly rotate the closure element, and as the rock shaft continues its upward movement, an orienting member on the chuck engages the lateral projection on the closure element to arrest the rotation thereof in a predetermined angular position relative to the container therebeneath. As a result, when the thus oriented closure elements are gripped by their chucks and are positioned on the corresponding containers, the lateral projections uniformly extend in a given vertical plane with respect thereto.

In accordance with another feature of the invention, in certain good embodiments, each of the arm members is moved downwardly during a portion of the downward movement of the adjacent chuck and includes an angularly extending portion which firmly holds the corresponding container in position as the closure element is applied thereto. The downwardly moving chuck extends through a mating opening in this arm portion and is maintained in exact vertical alignment with the container during the element applying operation.

In accordance with a further feature of the invention, in some embodiments, the lowermost positions of each of the arm members and chucks are automatically variable in response to slight variations in height of the containers therebeneath and these lowermost positions may be adjusted in a rapid and straightforward manner to accommodate containers of substantially greater height variations.

The present invention as well as further objects and features thereof will be understood more clearly and fully from the following description of certain preferred embodiments, when read in conjunction with the accompanying drawings in which:

FIGURE 1 is a perspective view of a machine for applying closure elements to containers which is illustrative of a preferred embodiment of the invention;

FIGURE 2 is an enlarged vertical sectional view, partly in elevation, of a portion of the machine, as viewed along the line 2—2 in FIGURE 1;

FIGURE 3 is a fragmentary sectional view, with certain parts shown in elevation, taken along the line 3—3 in FIGURE 2;

FIGURE 4 is a vertical sectional view of a closure element of a type the machine is especially well suited for applying to a container;

FIGURE 5 is a vertical sectional view of a representative container as the closure element of FIGURE 4 is applied thereto, together with certain cooperating portions of the machine;

FIGURE 6 is a vertical sectional view of a chuck and associated parts useful in connection with the invention;

FIGURE 7 is a sectional view taken along the line 7—7 in FIGURE 6;

FIGURE 8 is a sectional view taken along the line 8—8 in FIGURE 6;

FIGURE 9 is a sectional view taken along the line 9—9 of FIGURE 6;

FIGURE 10 is an elevational view of a portion of the chuck shown in FIGURE 6;

FIGURES 11 and 12 are top plan views of closure elements which have been applied to their corresponding containers by the machine of FIGURE 1;

FIGURE 13 is a fragmentary sectional view taken along the line 13—13 in FIGURE 8;

FIGURES 17 through 22 are schematic illustrations of the chuck of FIGURE 6 as it is effective to apply a closure element to a container;

FIGURE 23 is a schematic illustration similar to FIGURES 17 through 22 but showing a closure element as it is discarded from the chuck in cases in which there is no corresponding container therefor;

FIGURE 24 is a vertical sectional view similar to FIGURE 6 but illustrating an alternative chuck and associated parts useful in connection with the invention, together with a representative closure element;

FIGURE 25 is a sectional view taken along the line 25—25 in FIGURE 24;

FIGURE 26 is a view similar to the lower portion of FIGURE 24 but illustrating the closure element in a different position;

FIGURE 27 is an elevational view of a portion of the chuck shown in FIGURE 24;

FIGURE 28 is a view, partially in section, taken generally along the line 28—28 in FIGURE 24; and FIGURE 29 is an elevational view of a portion of the chuck shown in FIGURE 24, with certain parts shown in section.

Figure 14:
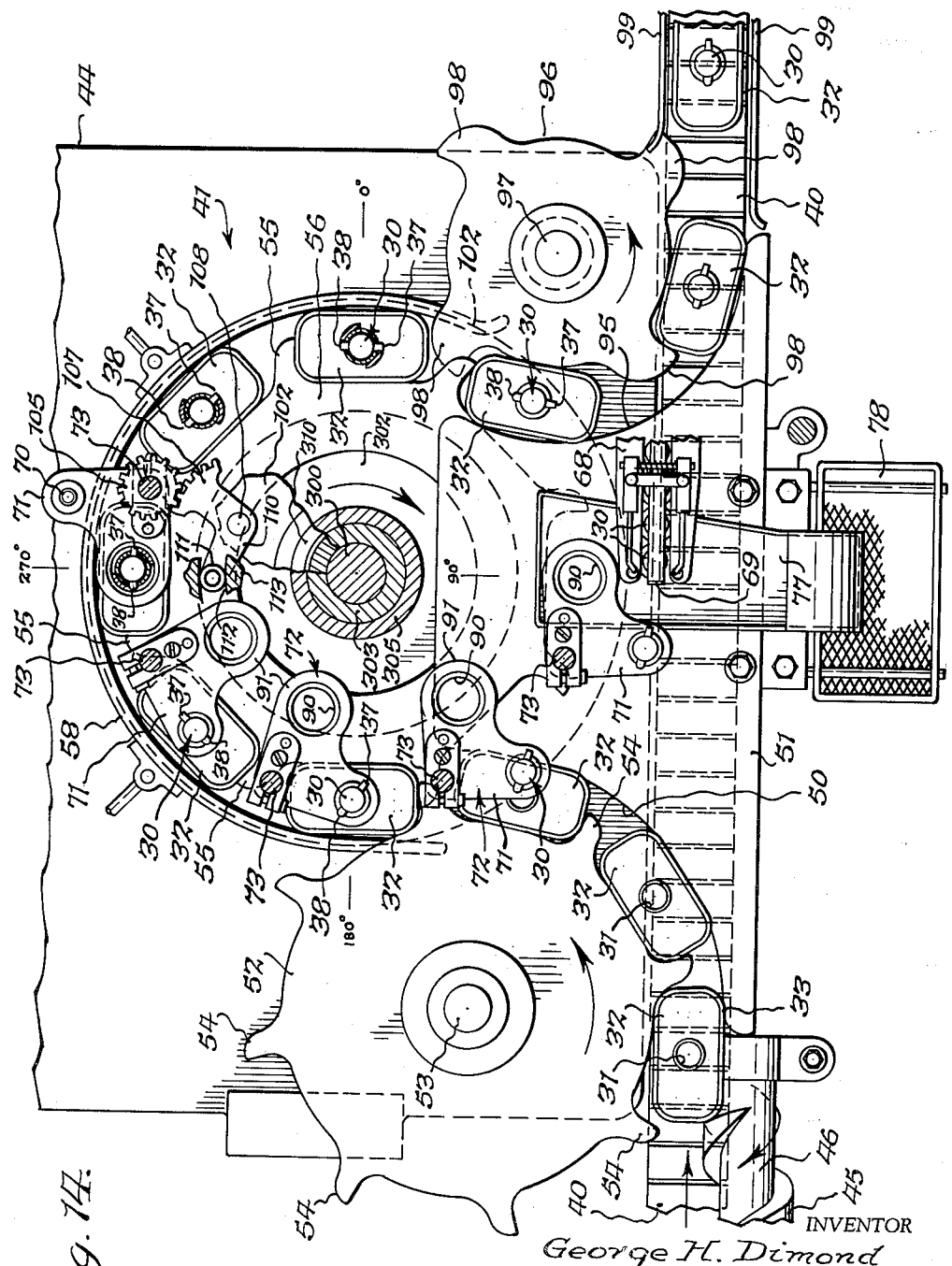
FIGURE 14 is a plan view of a portion of the machine, with certain parts broken away and others shown in section, as viewed along the line 14—14 in FIGURE 2.

Referring to the drawings, there is shown a machine for inserting a closure element, such as a cap 30 (FIGURES 4 and 5), in a corresponding opening 31 in a can 32 or other suitable container which is provided with the usual rim or collar 33 around its upper surface. The cap 30 illustratively is fabricated from a plastic material and includes a plug or pouring spout 34 having an enlarged annular flange 35 thereon which is adapted to engage the upper surface of the can adjacent the opening 31. A ledge 35a extends around the spout 34 beneath the flange 35, and the ledge is spaced from this flange in position to receive the adjacent can portion therebetween. The cap 30 additionally includes a snap-on cover 36 which is secured to the spout 34 by an integrally formed, flexible hinge 37 laterally projecting from one side thereof. A lifting tab 38 extends in a lateral direction from the opposite side of the cap. The tab 38 is integrally formed with the cover 36 and is disposed at a level above that of the hinge 37 when the cap is in the position shown in FIGURES 4 and 5.

The machine is adapted to apply successive caps 30 to the cans 32 in a manner such that the hinge 37 and the tab 38 on each cap extends in a uniform vertical plane with respect to the corresponding can.

In order to facilitate the detailed description of the closure machine illustrated in the drawings, there will first be given a discussion of the general mode of operation of the machine. That is, before describing the construction and arrangement of the various parts of such machine, a description will be given of its overall function in applying the caps 30 to the cans 32.

*General Operation*

As best shown in FIGURES 1 and 14, the cans 32 to which the caps 30 are to be applied are either automatically or manually deposited one by one on an elongated belt conveyor 40 with their openings 31 uppermost. The conveyor 40 extends from one side of the machine to the other and advances the incoming cans 32 from left to right, as viewed in FIGURE 1, toward a rotary turret indicated generally at 41. The conveyor is supported and driven by suitable sprockets 42 which are positioned adjacent the ends of a horizontally disposed arm 43 mounted on the machine base 44. As the incoming cans move forward, they are uniformly spaced on the conveyor 40 by a continuously rotating helicoid 45 which extends along one side of the conveyor on the infeed side of the turret 41 and is provided with a relatively wide spiral groove 46. A fixed rail 47 on the opposite side of the conveyor urges the incoming cans 32 against the helicoid 45 so that the cans register in the groove 46 and are uniformly spaced apart as they approach the turret.

The thus spaced cans 32 moving along the conveyor 40 strike the arcuate edges 50 of two fixed guide plates 51, only one of which is visible in FIGURES 1 and 14. These plates are mounted one above the other adjacent the central portion of the conveyor and serve to direct the incoming cans 32 toward a pair of star wheels 52 which are coaxially positioned above the base 44 on the infeed side of the turret 41 and rotate continuously in a counterclockwise direction, as viewed in FIGURE 14. Each of the wheels 52 is affixed adjacent the upper end of a vertically disposed shaft 53 supported by the base 44 and includes a series of teeth 54 around its periphery which engage the cans 32 and transfer them from the conveyor 40 onto the rotating turret. The teeth 55 of two coaxial star wheels 56 and 57 (FIGURE 2) mounted for rotation with the turret 41 thereupon contact the incoming cans 32, and the cans are maintained on the turret as it rotates in a clockwise direction, as viewed in FIGURE 14, through an angle of approximately two hundred and forty degrees. A fixed, semi-circular rail 58 which is concentric with the turret 41 is positioned around the cans 32 thereon and serves to hold these cans between the teeth 55 as the star wheels 56 and 57 rotate.

The caps 30 for the cans 32 are dumped in random fashion into the infeed hopper 65 (FIGURE 1) of a feeding mechanism 66 which is supported above and to one side of the turret 41 by means of a column 67 adjustably affixed to the machine base 44. As will be understood, the mechanism 66 includes a rotating disc (not shown) inside a volute casing which operates in a known manner to agitate the caps 30 and deposit them on a chute 68 with their covers 36 uppermost. The chute 68 extends downwardly from the feeding mechanism, and its lower end is spaced above the conveyor 40 adjacent the periphery of the turret 41 and is provided with a spring biased pallet 69 (FIGURE 14) which maintains the lowermost cap 30 in position on the chute. The operation of the feeding mechanism 66 is such as to maintain an ample supply of caps 30 on the chute 68 at all times.

As the turret 41 rotates, the lowermost cap 30 on the chute 68 is received by an upstanding button 70 which is rotatably supported adjacent the outer end of one arm 71 of an L-shaped arm member 72. Eight of the arm members 72 are equally spaced around the periphery of the turret 41, and each successive button 70 thereon picks up one of the caps 30 as it passes beneath the chute 68. As best shown in FIGURE 3, each of the L-shaped members 72 is suitably affixed adjacent its apex to the lower end of a vertically disposed shaft 73 which is adapted for rocking movement about its axis and is also reciprocably movable therealong to thereby control the position of the attached arm member 72 relative to the turret 41. The vertical disposition of each arm member 72 as the turret rotates is illustrated schematically in FIGURE 15 by the curve 75, while the angular disposition of each member 72 with respect to its shaft 73 is shown by the curve 76. In this figure, the abscissas for the various points on the curves shown therein are measured in terms of degrees of rotation of the turret 41 from a reference position ninety degrees prior to the position of the lower end of the chute 68. At the time the arm 71 on each arm member 72 passes beneath the chute 68, the corresponding button 70 is positioned within the spout 34 of the lowermost cap 30 in the chute and removes this cap therefrom.

Figure 15:
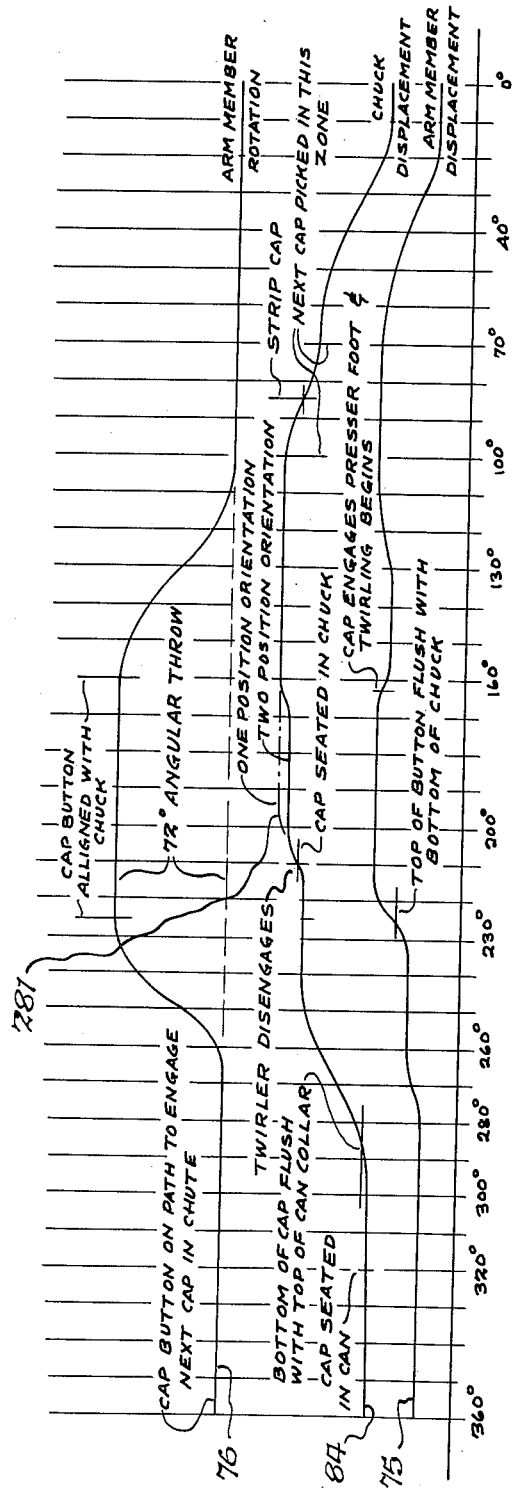
FIGURE 15 is a diagrammatic representation of the vertical and angular dispositions of certain parts of the machine.

Each arm member 72 then moves downwardly a short distance, and, as shown by the portion of the curve 76 between the one hundred and ten degree and one hundred and sixty degree positions of the turret 41, is pivoted about the axis of its shaft 73 through an angle of approximately seventy-two degrees in a manner such that the cap 30 carried by the button 70 on the corresponding arm 71 is moved inwardly and is positioned directly beneath an adjacent cap receiving chuck 80 (FIGURE 3). The relative disposition of the cap 30, the arm 71 and the chuck 80 during this portion of the operation cycle is illustrated schematically in FIGURE 17. Eight of the chucks 80 are equally spaced around the periphery of the turret 41, and each of these chucks is supported at the lower end of a hollow shaft 81 which is mounted for vertical, reciprocable movement on the turret adjacent one of the arm member shafts 73 in parallel relationship therewith. In FIGURE 15, the vertical disposition of each chuck 80 is shown schematically by the curve 84. The relative positions of the chucks 80 and the teeth 55 on the star wheels 56 and 57 are such that one of these chucks is in substantial vertical alignment with the opening 31 of each of the cans 32 on the rotating turret 41.

Upon the seventy-two degree pivotal movement of each arm member 72 to position the cap 30 carried by the corresponding button 70 beneath the adjacent chuck 80, the member 72 is moved upwardly, and as shown schematically in FIGURE 18, the cap cover 36 frictionally engages the foot 82 of a rotating plunger or twirler 83 which is positioned within the hollow chuck shaft 81. As the arm member and cap continue their upward movement, the rotating twirler 83 is urged in an upward direction by the cap cover, and the cap 30 is rotated relative to its chuck to thereby twirl the cap about its axis. This twirling action takes place as the turret 41 rotates from one hundred sixty-three degrees to approximately two hundred degrees, during which time the chuck 80 moves downwardly a short distance, as schematically illustrated in FIGURE 15 by the full line portion of the curve 84, to bring the lower portions of two chuck jaws 85 and 86 (FIGURE 6) to the level of the cap hinge 37. As best shown in FIGURE 9, these jaws are disposed on opposite sides of the chuck and are provided with recesses 87 and 88 therebetween. The lifting tab 38 and the hinge 37 on the revolving cap 30 are positioned in these recesses as the chuck descends and strike the chuck jaws 85 and 86 to thereby arrest the rotation of the cap in a manner such that the lifting tab and hinge are disposed in a predetermined vertical plane which is, for instance, parallel to the longitudinal, vertical sides of the can 32 therebeneath. In certain advantageous embodiments of the invention, the cap 30 is oriented with its lifting tab 38 extending in this plane in either of two directions: that is, with the tab 38 extending to the right, as shown in FIGURE 11, or to the left, as shown in FIGURE 12. In other good embodiments, as will become more fully apparent hereafter, the cap 30 is oriented in a single position with its lifting tab 38 extending in a predetermined direction relative to the corresponding container.

At the time the continuously rotating turret 41 passes through an arc of around two hundred degrees, the cap 30 has reached its fully oriented position, and the corresponding chuck 80 again is moved in a downward direction to the position shown in FIGURE 20. The jaws 85 and 86 spread slightly and firmly grasp the cap 30 therebetween. Thereafter, the rotation of the twirler 83 about its axis is arrested, and as indicated schematically in FIGURE 15 by the portion of the curve 75 between the two hundred and ten degree and two hundred and thirty degree positions of the turret 41, the adjacent arm member 72 moves downwardly relative to its chuck to remove the button 70 on the arm 71 from within the cap spout 34.

As the button 70 on each arm 71 clears the associated cap spout 34, the corresponding L-shaped arm member 72 pivots about the axis of its shaft 73 in a clockwise direction, as viewed in FIGURE 14, to return the arm 71 to its initial position, thus aligning the button 70 with the chute 68 to enable another cap 30 to be picked up as the button passes beneath the chute during the next revolution of the turret 41. During this pivotal movement, a circular opening 90 adjacent the outer end of the other arm 91 of the member 72 is positioned in axial alignment with the cap carrying chuck 80. Upon the rotation of the turret 41 through an arc of between two hundred and fifty and two hundred and ninety degrees, the chuck 80 again is moved downwardly, and just prior to the latter portion of this downward movement, the arm member 72 is lowered to its lowermost, FIGURE 22 position. In this position, the arm 91 of the member 72 contacts the can 32 therebeneath, and the can opening 31 is accurately maintained in exact vertical alignment with the chuck 80 by means of an annular boss 92 and two lugs 93 and 94 on the lower surface of the arm 91. The jaws 85 and 86 of the downwardly moving chuck 80 then descend through the opening 90, and the cap 30 between these jaws is urged into the can opening 31 and is firmly held in position by the annular flange 35 and the ledge 35a (FIGURE 4).

Shortly after the start of the next revolution of each of the chucks 80 around the axis of the rotating turret 41, the chuck is moved in an upward direction. During the initial portion of this upward movement, the chuck jaws 85 and 86 release the cap 30 therebetween. As the capped can 32 beneath these jaws continues its movement on the turret 41, it engages two arcuate edges 95 (FIGURE 14) formed on the fixed plates 51 opposite the edges 50 and is urged thereby toward a pair of rotating star wheels 96. Only one of the edges 95 and one of the star wheels 96 is visible in FIGURE 14. The wheels 95 are coaxially mounted on a vertically disposed shaft 97 extending upwardly from the base 44 adjacent the outfeed portion of the conveyor 40 and are each provided with a series of teeth 98 which engage the capped cans 32 and urge them onto this conveyor portion. The cans 32 returning to the conveyor 40 are maintained in an upright position as they are advanced thereby by two fixed rails 99 which extend in a longitudinal direction on either side of the conveyor outfeed portion.

After the initial upward movement of each of the chucks 80 has released the cap 30 between the chuck jaws 85 and 86, the corresponding arm member 72 likewise begins to move in an upward direction, and the button 70 thereon picks up another of the caps 30 from the chute 68 as the arm member reaches its uppermost position. Thereafter, the upward movement of the chuck 80 continues until it is again disposed in position to receive the cap carried by the arm member. During a portion of the upward movement of the chuck 80, the corresponding movement of its twirler 83 is arrested, and the twirler foot 82 emerges below the chuck jaws 85 and 86 as the rotating turret 41 reaches its eighty-five degree position.

In cases in which no can 32 is in position beneath the chuck 80, the cap 30 remains between these jaws as the chuck moves upwardly, and the emerging foot 82 strikes this cap and ejects it from between the jaws. The thus discarded cap 30 drops through the opening 90 in the arm 91 of the member 72 onto a fixed, inclined chute 77 (FIGURE 1) which extends over the central portion of the conveyor 40. The discarded cap slides down this chute into a basket 78 suitably supported on the side of the conveyor opposite that adjacent the turret 41.

A detailed description of the machine will now be set forth.

Arm Member Control Mechanism

As best shown in FIGURE 3, each of the shafts 73 extends upwardly from the corresponding arm member 72 through two bushings 100 and 101 respectively mounted in a lower plate 102 and an upper plate 103 which form parts of the turret 41 and rotate therewith. The plates 102 and 103 are each of circular configuration and are horizontally disposed one above the other in spaced parallel planes. A spur gear 105 is suitably secured to each shaft 73, as by a set screw 106, and is spaced above the lower turret plate 102 in meshing engagement with a gear sector 107 which is pivotally affixed to the lower plate 102 by a pin 108 (FIGURE 14) located approximately midway between the axes of the shaft 73 and the turret.

Figure 16:
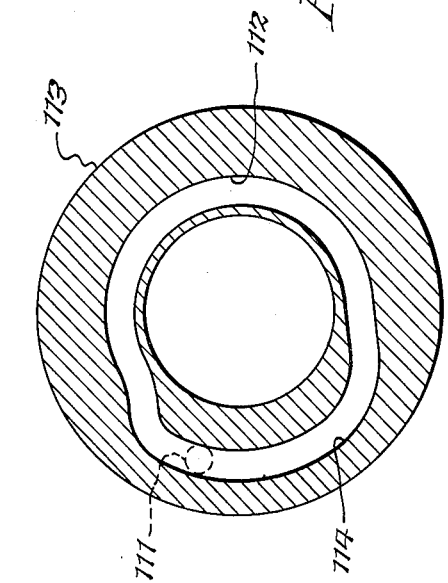
FIGURE 16 is a sectional view of a particular part of the machine, taken along the line 16—16 in FIGURE 2.

A gear sector 107 is provided for the spur gear 105 on each arm member shaft 73. Each of the sectors 107 includes an angularly extending arm 110 having an upstanding roller 111 adjacent its outer end. The roller 111 on each gear sector is slidably disposed in a groove 112 in the lower surface of a stationary cylindrical cam 113 which is coaxial with the turret 41. As best shown in FIGURE 16, the groove 112 is substantially circular but includes an offset portion 114 which is spaced farther from the turret axis than the remaining groove portion.

A coil spring 120 (FIGURE 3) is disposed around each arm member shaft 73 between the spur gear 105 and an annular plate 121 slidably positioned on the shaft. The tension in the spring 120 urges the plate 121 upwardly against the laterally extending arm 122 of an arm member bracket 123, the major portion of which is substantially in the form of a sleeve slidably disposed on the adjacent chuck shaft 81. The outer end of the arm 122 in contact with the plate 121 is bifurcated to accommodate the shaft 73 and is positioned between the plate 121 and a flared portion 124 of the shaft 73 which, in the position shown in FIGURE 3, is spaced slightly above this arm end to permit the arm and its bracket 123 to move vertically a short distance with respect to the shaft. The arm 122 is provided intermediate its ends with a roller 125 which extends in an inward direction into a groove 126 in the cylindrical surface of the fixed cam 113 and controls the vertical movement of the shaft 73 and its attached arm member 72.

The upper end of each of the arm member shafts 73 extends through the bushing 101 in the upper plate 103 and is provided with a laterally extending bracket 135 having a depending pin 136 at its outer end. In the lowermost position of the shaft 73 (the position shown), this pin extends into a bushing 137 which is positioned in an aperture 138 in the upper plate immediately adjacent the bushing 101.

Each of the L-shaped arm members 72 is rigidly affixed to the lower end of the corresponding shaft 73 by means of a bracket 140 which is adjustably secured to the shaft by set screws 141. The member 72 is substantially flat but includes the boss 92 (FIGURE 5) which is integrally formed therewith and extends downwardly from adjacent the opening 90 in the arm 91 of each member. The diameter of this boss is substantially equal to the inner transverse dimension of the can collar 33. The lugs 93 and 94 on the member 72 extend in a downward direction adjacent the inner portion of the arm 91 and are spaced apart by a distance sufficient to receive a portion of the collar 33 therebetween.

As the turret 41 rotates, the grooves 112 and 126 in the cam 113 respectively control the rotational movement of each of the arm member shafts 73 about its axis and the vertical displacement of each shaft. Thus, as the roller 111 (FIGURE 14) on each gear sector arm 110 moves along the major portion of the cam groove 112, the gear sector 107 remains fixed relative to the rotating turret, and the angular position of the shaft 73 with respect to the turrent remains the same. As the rotating turret 41 reaches its one hundred and ten degree position and the roller 111 enters the groove offset portion 114, however, the gear sector 107 pivots about its pin 108 to rotate the meshing spur gear 105 and the shaft 73 in a counterclockwise direction, as viewed in FIGURE 14, through an angle of seventy-two degrees. The arm 71 on the member 72 similarly rotates and positions the cap 30 on the button 70 beneath the adjacent chuck 80 in the manner described heretofore. As the roller 111 returns to the major portion of the groove 112, its gear sector 107 pivots in the opposite direction to return the shaft 73 and the arm member 72 to their initial positions.

The roller 125 on the arm member cam bracket 123 moves along the cam groove 126 as the turret 41 rotates and is vertically displaced in both an upward direction and a downward direction in the manner shown schematically by the curve 75 in FIGURE 15. During the various upward movements of the roller 125, the attached bracket 123 slides along the chuck shaft 71, and the bifurcated end of the bracket arm 122 engages the flared portion 124 of the arm member shaft 73, thereby urging the shaft 73 and the attached arm member 72 upwardly at the appropriate times in the operation cycle described heretofore. During downward movement of the roller 125 and its bracket 123, the bracket arm 122 exerts a downwardly directed force on the plate 121, the spring 120 and the spur gear 105 to thereby lower the attached shaft 73 and the arm member 72. As indicated heretofore, the arm member 72 is moved to its lowermost position in contact with the can 32 beneath the adjacent chuck 80 immediately prior to the insertion of the cap 30 in the can opening 31, and the boss 92 and the lugs 93 and 94 on the arm 91 engage the can collar 33 to orient the can in its exact cap applying position. As the boss 92 and the lugs 93 and 94 strike the can, the downward movement of the arm member 72 and the shaft 73 is arrested, and the spring 120 is compressed slightly by the downwardly moving bracket arm 122, thereby enabling this arm and its roller 125 to move to their lowermost positions. In cases in which cans of varying heights are advanced through the machine, the compression of each coil spring 120 varies correspondingly as the can associated therewith is engaged by the adjacent boss 92 and the lugs 93 and 94, and each can is automatically and firmly held in its cap applying position.

Chuck and Twirler Mechanism

As best shown in FIGURE 6, each of the chucks 80 includes a vertically disposed, cylindrical body portion 200 which is provided with an axial bore 201 extending therethrough. The upper end of this bore accommodates the depending end of the corresponding chuck shaft 81, and the body 200 is maintained in rigid but adjustable relationship therewith by a set screw 200a. The lower portion 202 of the body 200 is of reduced diameter, thereby forming a shoulder 203, and the portion 202 is threaded at its lower end, as at 204, to adjustably support a presser sleeve 205 which is rigidly secured thereto by two set screws 206 (FIGURE 13). Two oppositely disposed notches 207 and 208 extend in an upward direction from the bottom of the sleeve 205.

The chuck jaws 85 and 86 are disposed around the presser sleeve 205 and extend downwardly therefrom. These jaws are each of arcuate cross section and are spaced from each other to form the recesses 87 and 88, the lower portions of which are enlarged by cutting away the sides of the jaws 85 and 86 thereadjacent. The relative disposition of the recesses 87 and 88 and the notches 207 and 208 in the presser sleeve is such that a continuous opening is provided from one recess to the other, and one vertical edge of each recess is in substantial alignment with an adjacent edge of each notch.

Each of the jaws 85 and 86 includes an inwardly extending flange 215 adjacent its upper portion which, in the position shown in FIGURE 6, is disposed immediately above the upper surface of the presser sleeve 205. The lowermost inner edge of each flange is substantially straight and forms a fulcrum 220, while the upper, outer edges of the flanges are beveled to form bearing surfaces 221. A cylindrical housing 225 rests on the flanges 215 and is disposed around the reduced portion 202 of the chuck body 200 in spaced, coaxial relationship therewith. The lower end of the housing 225 is partially closed and supports one end of a coil spring 226 which extends around the body portion 202 and abuts the shoulder 203 at its other. The tension in the spring 226 urges the housing 225 downwardly against the jaw flanges 215 and serves to bias the jaws 85 and 86 inwardly toward their closed (FIGURE 6) position. An elastic retaining ring 227 is positioned beneath the housing 225 around the jaws 85 and 86 and serves to resiliently maintain these jaws on the chuck during upward movement of the housing 225 against the tension in the spring 226.

Each of the plungers or twirlers 83 includes an elongated shaft 230 which is slidably and rotatably disposed within the hollow chuck shaft 81. The lower end of the shaft 230 is positioned in the bore 201 of the chuck body 200 and is connected by means of a coupling 231 to a shaft 232 which extends through the partially closed, bottom portion of the body 200 and is affixed to the twirler foot 82. A twirler retracting spring 233 surrounds the shaft 232 between the coupling 231 and the bottom portion of the body 200 and tends to urge the coupling, together with the attached shaft 232 and the foot 82, in an upward direction with respect to the chuck body.

As best shown in FIGURE 3, the hollow chuck shaft 81 extends upwardly from the chuck 80 through two bushings 240 and 241 which are respectively disposed in the lower plate 102 and the upper plate 103 adjacent the arm member shaft bushings 100 and 101. The twirler shaft 230 within the chuck shaft 81 protrudes above the upper end of the chuck shaft, and its protruding end is provided with a cup-shaped member 245. A vertically reciprocable stub shaft 250 (FIGURE 6) is spaced above the twirler shaft 230 in axial alignment therewith and includes a thrust bearing 251 at its upper end. In the lowermost position of the shaft 250, the bearing 251 rests on an internal shoulder 252 formed adjacent the lower end of an upstanding cylindrical housing 253 into which the stub shaft 250 extends. This housing is rigidly supported on a turret plate 255 which forms the top of the turret 41 and rotates therewith. A coil spring 256 is disposed within the housing 253 between the closed upper end of the housing and the thrust bearing 251, and the spring 256 urges this bearing in a downward direction toward the shoulder 252. A spur gear 260 is fixedly secured to the lower end of each of the stub shafts 250, and each gear 260 is in meshing engagement with a stationary spur gear 261 which is concentric with the turret 41 and is disposed immediately beneath the turret top plate 255.

Each of the hollow chuck shafts 81 includes a collar 265 (FIGURE 3) which is affixed thereto by a set screw 266 immediately above the arm member bracket 123 thereon. A coil spring 267 is mounted around each shaft 81 between the collar 265 and an annular plate 268 slidably disposed thereon above the collar. The tension in this spring urges the plate 268 in an upward direction into engagement with a laterally extending arm 270 of a chuck bracket 271, the major portion of which is in the form of a sleeve slidably positioned on the adjacent arm member shaft 73 above the flared portion 124 thereof. The outer end of the bracket arm 270 is bifurcated to accommodate the chuck shaft 81 and is positioned between the plate 268 and a flared portion 272 of the chuck shaft. A second bracket arm 273 extends in a direction parallel to that of the arm 270 and is provided at its outer end with an inwardly disposed roller 275 which is positioned in a groove 276 extending around the cylindrical cam 113 above the groove 126.

As the turret 41 rotates, the roller 275 on the arm 273 of each chuck bracket 271 rides in the cam groove 276 and moves upwardly and downwardly along the path shown schematically by the curve 84 in FIGURE 15, to similarly move the corresponding bracket 271, the shaft 81 and the chuck 80. Shortly after the start of each revolution of the turret, these components begin their upward movement, and the twirler 83 likewise is carried in an upward direction by the spring 233 (FIGURE 6) which at this time is urging the coupling 231 upwardly relative to the chuck body 200 to hold the twirler foot 82 in engagement with the lower surface of the reduced body portion 202. Prior to the termination of the upward movement of the chuck 80 and its shaft 81, however, the cup-shaped member 245 on the twirler shaft 230 engages the lower surface of the spur gear 260 thereabove. The tension in the coil spring 256 is substantially greater than that in the spring 233, and as the chuck 80 continues to move upwardly this latter spring begins to compress while the spring 256 holds the bearing 251 firmly against the shoulder 252 of the housing 253 to prevent vertical movement of the stub shaft 250 and its spur gear 260. Further upward motion of the twirler 83 is thereby arrested, and the twirler foot 82 emerges from beneath the chuck jaws 85 and 86 as the chuck continues its ascent. In case in whch a preceding cap 30 remains between the chuck jaws 85 and 86, the foot 82 ejects this cap, as shown in FIGURE 23, and the discarded cap drops into the chute 77 (FIGURE 1) and is deposited in the basket 78.

The upward motion of the chuck 80 is then arrested, and as the rotating turret 41 reaches its one hundred and sixty-three degree position, the cap 30 on the button 70 of the corresponding arm member 72 frictionally engages the twirler foot 82 in the manner described heretofore. At this time in the operation cycle, the arm member 72 is moving in an upward direction relative to the chuck 80, and the twirler foot 82, the shafts 230 and 232, the cup-shaped member 245, the spur gear 260, the stub shaft 250 and the bearing 251 all move upwardly against the tension in the spring 256. As the bearing 251 is lifted from its shoulder 252, this spring exerts a downwardly directed force on the stub shaft 250 and the spur gear 260. The gear 260 is continuously rotated about its axis by the spur gear 261 as the turret revolves, and considerable torque is transmitted by the spring 256 from the gear 260 to the cup-shaped member 245, thereby rotating the member 245, the attached shafts 230 and 232 and the twirler foot 82 relative to the chuck 80 to similarly rotate the cap 30. As the cap spins, the upward motion of the arm member 72 and the twirler 83 is arrested, and the cam roller 275, the bracket 270, the shaft 81 and the chuck 80 move downwardly a short distance to position the cap hinge 37 and the lifting tab 38 in the oppositely disposed recesses 87 and 88. Depending upon the rotational position of the cap at the time the chuck jaws 85 and 86 reach the level of the lifting tab 38, this tab may be disposed either in the recess 87 or in the recess 88. Should either jaw strike the upper surface of the lifting tab as the chuck descends, the jaw pivots about the fulcrum 220 on the jaw flange 215, and the lower end of the jaw moves outwardly until such time as the tab 38 on the rotating cap is oriented beneath one of the recesses 87 or 88. During this outward movement, the bearing surface 221 on the jaw flange urges the housing 225 in an upward direction relative to the chuck body 200 against the tension in the spring 226, and this spring thereafter returns the jaw to its initial position.

As the cap 30 continues its rotation, the hinge 37 and the lifting tab 38 strike the adjacent edges of the recesses 87 and 88, and the cap comes to rest with its hinge and tab oriented in a predetermined vertical plane relative to the can 32 therebeneath. The location of this plane may be adjusted in a rapid and straightforward manner by loosening the set screw 200a and rotating the chuck 80 relative to its shaft 83 until the jaw slots 85 and 86, together with the notches 207 and 208 in the presser sleeve, are in the desired position.

Upon the rotation of the turret 41 to its two hundred degree position, the chuck 80 is again moved downwardly relative to the arm member 72 and the twirler 83, and the chuck jaws 85 and 86 engage the cap flange 35 (FIGURE 4) and pivot outwardly about their fulcrums 220. The downwardly moving jaws 85 and 86 pass over the pouring spout 34 and are returned to their closed position by the force exerted by the coil spring 226 on the housing 225 and the bearing surfaces 221, thereby firmly clamping the cap 30 in position between the jaws. In this clamped position, the hinge 37 and the lifting tab 38 of the cap extend outwardly through the presser sleeve notches 207 and 208 and the jaw recesses 87 and 88. Thereafter, as the chuck 80 continues its downward movement and the corresponding arm member 72 is lowered in the manner described heretofore, the chuck body 200 strikes the upper surface of the twirler foot 82, and the chuck 80 and the twirler 83 move downwardly in fixed relationship with each other until the thrust bearing 251 at the lower end of the stub shaft 250 engages the shoulder 252, at which time the cup-shaped member 245 loses contact with the spur gear 260 and the rotation of the twirler 83 stops. The downward movement of the chuck 80 is then arrested, while the arm member 72 continues its descent and pivots about the axis of its shaft 73 to remove the button 70 on the arm 71 from beneath the chuck and to position the opening 90 in the arm 91 in vertical alignment therewith.

As the rotating turret 41 reaches its two hundred and fifty degree position, the roller 275 again urges the corresponding chuck 80 in a downward direction. Just prior to the latter portion of this downward movement, the corresponding arm member 72 is lowered, and the boss 92 and the lugs 93 and 94 on the arm 91 engage the collar 33 of the can 32 therebeneath in the manner described above. The downwardly moving chuck 80 passes through the opening 90 in the arm 91, and the chuck jaws 85 and 86 strike the upper surface of the can 32, thereby arresting their descent. The chuck body 200, the presser sleeve 205 and the twirler 83, however, continue to move downwardly a short distance, thus compressing the coil spring 226, and the presser sleeve 205 strikes the flange 35 of the cap 30 and combines with the twirler foot 82 in engagement with the cap cover 36 to urge the cap into position in the can opening 31. In this position, the cap 30 is firmly held in place by means of the flange 35 and the ledge 35a which are disposed on opposite sides of the upper can surface. The resiliency afforded by the chuck spring 267 (FIGURE 3) enables the downward motion of the body 200, the sleeve 205 and the twirler 83 to be arrested at various levels depending upon the height of the particular can 32 therebeneath.

In certain advantages embodiments, the vertical disposition of the presser sleeve 205 relative to the chuck body 200 is adjusted by means of the set screws 206 and the threads 204 such that the presser sleeve strikes the cap flange 35 immediately after the twirler foot 82 begins to urge the cap 30 downwardly relative to the jaws 85 and 86 into the can opening 31. The foot 82 thereby applies a major portion of the thrust of the descending body 200 to the cap, while the sleeve 205 is in a close, follow-up position. As a result, the possibility of permanently deforming or otherwise damaging the cap as it is inserted in the opening 31 is substantially eliminated.

*One Position Orientation*

In cases in which it is advantageous or desirable to orient a laterally extending cap projection, such as the lifting tab 38, for example, so that the projection is disposed in a single predetermined position relative to the corresponding can 32, each of the chucks 80 on the turret 41 is replaced by an alternate chuck 280 (FIGURE 24), and a portion of the chuck groove 276 on the cam 113 is altered, as shown schematically by the dot-dash line 281 in FIGURE 15, in a manner such that the alternative chuck remains in its uppermost position as it is carried by the continuously rotating turret from approximately one hundred degrees to two hundred degrees during each turret revolution. In addition, a spur gear 282 of reduced diameter is substituted for the spur gear 260 on each of the stub shafts 250 for the twirlers 83.

The alternative chuck 280 includes a cylindrical, hollow body 283 which is rigidly but adjustably secured to the depending end of the hollow chuck shaft 81 in axial alignment therewith. The lower portion of the body 283 is threaded, as at 284, and accommodates the upper end of a substantially cylindrical presser sleeve 285 which extends downwardly therefrom and is provided with an elongated, vertically disposed slot 286 (FIGURE 25). Two chuck jaws 287 and 288 are disposed around the sleeve 285, and each of these jaws includes an inwardly extending flange 290 which, in the position illustrated in FIGURE 24, is disposed immediately above the upper surface of the sleeve. The jaws 287 and 288 are substantially similar to the jaws 85 and 86 of the chuck 80 (FIGURE 6), but the adjacent jaw portions are arcuately notched to form oppositely disposed recesses 291 and 292 which are somewhat larger than the recesses 87 and 88 in the jaws 85 and 86. The jaws 287 and 288 are urged inwardly toward the positions shown in FIGURE 24 by a coil spring 293 which extends around the chuck body 283 and urges a surrounding housing 294 downwardly against the jaw flanges 290. The configuration and mode of operation of the spring 293 and the housing 294 is substantially the same as that of the spring 226 and the housing 225 described heretofore.

The lower shaft 232 of the twirler 83 extends downwardly through the chuck body 283 and is surrounded by the sleeve portion 295 of an orienting member 296. The member 296 is slidably disposed with respect to the shaft 232 and includes a circular flange 297 integrally formed at the lower end of the sleeve portion 295 which, in the position shown in FIGURE 24, rests on the twirler foot 82. A cap screw 298 extends radially into the flange 297 and is provided with a head portion 299 positioned in an elongated, vertically disposed slot 277 (FIGURE 27) in the presser sleeve 285, thereby preventing rotational movement of the member 296 relative to the presser sleeve but permitting limited vertical movement with respect thereto. An orienting dog 278 is integrally formed with the member 296 and extends downwardly from the flange 297. In the position shown in FIGURE 24, the dog 278 projects beneath the lowermost portions of the jaws 287 and 288 and is biased in a downward direction by a coil spring 279 which is positioned within the twirler retracting spring 233 between the coupling 231 and the upper surface of the sleeve portion 295.

As the arm member 72 corresponding to each alternative chuck 280 rotates about the axis of the turret 41 through an arc of one hundred and sixty-three degrees and moves upwardly to raise the cap 30 carried thereby into engagement with the rotating twirler foot 82 in a manner similar to that described heretofore, the cap 30 carried by the button 70 on the arm member 72 rotates about its axis through as much as a three hundred and sixty degree angle, depending upon the random initial position of the cap. The slot 277 limits downward motion of the member 296 relative to the presser sleeve 285 to prevent engagement between the orienting dog 278 and any portion of the cap 30 until the upwardly moving arm member 72 carries the cap into contact with the twirler foot 82. Thereafter the lifting tab 38 on the rotating cap 30 engages the dog 278, and the rotation of the cap is arrested with the tab 38 extending laterally in a predetermined direction relative to the can 32 therebeneath. As the rotating turret 41 reaches its two hundred degree position, the alternative chuck 280 begins to move downwardly under the control of the roller 275 (FIGURE 3), and the jaws 287 and 288 spread slightly and firmly grasp the cap 30 therebetween. Thereafter, the operation cycle continues in the manner described heretofore, and as the caps 30 gripped by the chucks 280 are inserted into the openings 31 in the corresponding cans 32, the lifting tabs 38 on the caps are uniformly oriented relative to the cans and extend in the selected direction.

*Turret*

As best shown in FIGURE 2, the turret 41 rotates about an upright standard 300 which extends through a boss 301 on the machine base 44 in fixed relationship therewith. An annular base plate 302, which serves as a support for the cans 32 on the turret, is rotatably disposed on the boss 301 and includes an upwardly extending sleeve portion 303 through which the standard 300 extends. The lower star wheel 57 surrounds the sleeve portion 303 and is fixedly secured to the upper surface of the base plate 302, as by bolts 304, while the upper star wheel 56 is spaced above the wheel 57 and is suitably attached adjacent the lower end of a sleeve 305 which is integrally formed with the lower turret plate 102. The sleeve 305 extends downwardly from the turret plate 102, and its depending portion surrounds the sleeve portion 303 and, as will become more fully apparent hereafter, is maintained in fixed relationship therewith as the turret rotates.

A collar 310 rests on the upper surface of the lower turret plate 102 and supports a sleeve 311 which in turn serves as a support for a stationary cam bracket 312. The bracket 312 is prevented from rotating with respect to the standard 300 by a key 313 slidably disposed in an elongated keyway 314 in the standard. The cylindrical cam 113 is rigidly but adjustably secured to the bracket 312 by machine screws 315.

The upper plate 103 is maintained in fixed, spaced relationship with the lower plate 102 by a series of elongated spacers 320 (FIGURE 3) disposed around the periphery of these plates. The upper plate 103 is rotatably positioned on the standard 300 by means of a bearing sleeve 321 which is spaced above the cam bracket 312 by a spacer sleeve 322. A collar 323 and a second spacer sleeve 324 are disposed around the standard 300 above the upper plate 103 and support the stationary spur gear 261 which is keyed to the standard to prevent rotational movement with respect thereto. The top plate 255 is spaced above the upper plate 103 by elongated spacers 326 which are in vertical alignment with the spacers 320. This top plate is mounted on a bearing sleeve 328 positioned on the standard 300 above the spur gear 261 and is adapted to rotate with the upper plate 103 and the lower plate 102 about the standard. A cylindrical cover 329 surrounds the lower plate 102, the upper plate 103 and the top plate 255 and serves to enclose the various machine components between these plates.

During operation of the machine, the base plate 302, the star wheels 56 and 57, the lower turret plate 102, the upper turret plate 103 and the top plate 255 all rotate as a unit about the standard 300 and are driven at a uniform speed by a pin 330 which extends upwardly into a mating recess 331 in the lower surface of the base plate 302 and is affixed to a constantly rotating sleeve 332 disposed around the standard 300 adjacent the boss 301. As will be understood, the sleeve 332 is operatively connected to an electric motor 335 (FIGURE 1) by a belt 336 and by appropriate gearing in a gear box 337 suitably supported within the machine base 44. As the motor 335 rotates, it drives the turret 41 and also controls the operation of the shafts 53 and 97 (FIGURE 14) for the star wheels 52 and 96, the belt conveyor 40 and the helicoid 45 by means not shown but well known in the art. It will of course be understood that the various gear ratios, the angular positions of the star wheel shafts and the turret, etc., are all synchronized in proper timed relationship with each other.

As indicated heretofore, the resiliency afforded by the arm member spring 120 (FIGURE 3) and the chuck spring 267 enables the application of the caps 30 or other closure elements to cans of varying heights. In cases in which it is advantageous or desirable to apply the caps to cans of substantially greater height variations, the vertical disposition of the sleeve 305 of the lower turret plate 102 is adjusted relative to the sleeve portion 303 of the base plate 302 to move the chucks 80 and their corresponding arm members 72 either upwardly or downwardly with respect to the cans on the base plate. To effect this adjustment, the sleeve portion 303 is provided with a vertically disposed rack 340 which accommodates a pinion 341 affixed to the lower end of a stub shaft 342. The shaft 342 is journalled in a housing 343 integrally formed with the turret plate sleeve 305 and extends upwardly from the pinion 341 to a bevel gear 345 mounted at its upper end. A second bevel gear 346 is in meshing engagement with the gear 345 and is secured to one end of a horizontal shaft 347 which is journalled in a housing 348 suitably supported on the under surface of the turret plate 102. The shaft 347 extends outwardly in a radial direction with respect to the plate 102, and its outer end is provided with a socket 350 which accommodates a removable crank handle 351.

During the cap applying operation, the rack 340 and the pinion 341 hold the sleeves 303 and 305 in fixed relationship with each other as the turret 41 rotates. Should it be desired to change the containers being capped from, say, pint size cans to quart cans, for example, the rotation of the turret is arrested, and the shaft 347 is rotated by means of the crank handle 351 so as to rotate the bevel gears 345 and 346, the shaft 342 and the pinion 341 in a direction to raise the housing 343 and the integrally formed bottom plate sleeve 305 relative to the sleeve portion 303 of the base plate 302. As the bottom plate 102 moves upwardly, the upper plate 103, the top plate 255 and the chucks, arm members and other components carried by these plates likewise move in an upward direction, and the keys for the cam bracket 312 and the spur gear 261 slide along the keyway 314 to maintain the cam 113 and the gear 261 in fixed relationship therewith. The quart size cans are deposited on the conveyor 40, and the capping operation is resumed in the manner described heretofore.

Similarly, to lower the chucks and their arm members to accommodate cans of reduced height, the crank 351 is rotated in the opposite direction to move the bottom plate sleeve 305 downwardly relative to the sleeve portion 303 of the base plate 302. The arrangement is such that the machine is readily adjustable in a rapid and straightforward manner to apply the caps to cans of extremely wide height variations.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. A machine for applying closure elements to containers, comprising, in combination, a rotary turret for receiving successive containers from a supply thereof, a plurality of vertically reciprocable chuck members mounted around said turret adjacent the periphery thereof, means for respectively positioning the containers received by said turret beneath said chuck members in substantial vertical alignment therewith, a source of closure elements for said containers, element receiving means carried by said turret adjacent each of said chuck members for positioning one of the closure elements from said source beneath the adjacent member, means for rotating said turret at a uniform speed, means responsive to the rotation of said turret for rotating relative thereto each of the closure elements positioned beneath the adjacent chuck member, orienting means operable in response to the rotation of each said element for arresting the same as it reaches a predetermined orientation relative to the container therebeneath, jaw means mounted on each of said chuck members for gripping the thus oriented closure elements, and means for moving each of said chuck members in a downward direction upon the gripping of the corresponding closure element by said jaw means, to thereby apply said corresponding element to its container.

2. A machine for applying closure elements to containers, comprising, in combination, a rotary turret for receiving successive containers from a supply thereof, a plurality of vertically reciprocable chuck members mounted on said turret adjacent the periphery thereof and respectively positioned in substantial vertical alignment with the containers received thereby, twirling means carried by each of said chuck members and rotatably disposed with respect thereto, a source of closure elements for said containers, means mounted on said turret adjacent each of said chuck members for receiving one of the closure elements from said source and moving the same into engagement with the twirling means carried by the adjacent chuck member, means for rotating said turret, means responsive to the rotation of said turret for rotating each said twirling means relative thereto to similarly rotate the closure element engaged thereby, orienting means operable in response to the rotation of each said element for arresting the same as it reaches a predetermined orientation relative to the container therebeneath, jaw means mounted on each of said chuck members for gripping the thus oriented closure elements, and means for moving each of said chuck members in a downward direction upon the gripping of the corresponding closure element by said jaw means, to thereby apply said corresponding element to its container.

3. A machine for applying closure elements to containers, comprising, in combination, a rotary turret for receiving successive containers from a supply thereof, a plurality of vertically reciprocable chuck members mounted on said turret adjacent the periphery thereof, means for respectively positioning the containers received by said turret beneath said chuck members in substantial vertical alignment therewith, twirling means carried by each of said chuck members and rotatably disposed with respect thereto, a source of closure elements for said containers, a plurality of arm means, one for each chuck member, mounted on said turret for receiving successive closure elements from said source, means for rotating said turret at a uniform speed, first operating means responsive to the rotation of said turret for moving the closure element received by each said arm means into engagement with the twirling means carried by the corresponding chuck member, means for rotating each of said twirling means relative to said turret to similarly rotate the closure element engaged thereby, orienting means mounted on each of said chuck members for arresting the rotation of each said element as it reaches a predetermined orientation relative to the container therebeneath, means carried by each of said chuck members for gripping the thus oriented closure elements, and second operating means responsive to further rotation of said turret for moving each of said chuck members in a downward direction upon the gripping of the corresponding closure element by said last-mentioned means, to thereby apply said corresponding element to its container.

4. A machine for applying closure elements to containers, each of said elements having a laterally extending projection thereon, said machine comprising, in combination, a rotary turret for receiving successive containers from a supply thereof, a plurality of vertically reciprocable chuck members mounted around said turret adjacent the periphery thereof and respectively positioned above and in substantial vertical alignment with the containers received thereby, a source of said closure elements for said containers, means mounted on said turret adjacent each of said chuck members for receiving successive closure elements from said source and positioning the same between the adjacent member and the container therebeneath, means for rotating said turret at a uniform speed, means responsive to the rotation of said turret for rotating the thus positioned closure elements relative thereto, orienting means operable in response to the rotation of each said element for engaging the lateral projection thereon to thereby arrest the rotation thereof when its lateral projection reaches a predetermined vertical plane relative to the container therebeneath, means carried by each said chuck member for gripping the thus oriented closure elements, and means for moving each of said chuck members in a downward direction upon the gripping of the corresponding closure element, to thereby apply said corresponding element to its container.

5. A machine for applying closure elements to containers, each of said elements having a laterally extending projection thereon, said machine comprising, in combination, a rotary turret for receiving successive containers from a supply thereof, a plurality of vertically reciprocable chuck members mounted around said turret adjacent the periphery thereof and respectively positioned in substantial vertical alignment with the containers received thereby, twirling means carried by each of said chuck members and rotatably disposed with respect thereto, a source of said closure elements for said containers, arm means mounted on said turret adjacent each of said chuck members for receiving one of the closure elements from said source and positioning the same in frictional engagement with the twirling means carried by the adjacent member, means for rotating said turret at a uniform speed, means for rotating each said twirling means to similarly rotate the closure element engaged thereby relative to said rotating turret, orienting means mounted on each of said chuck members for engaging the lateral projection on the corresponding closure element to thereby arrest the rotation thereof when its lateral projection reaches a predetermined vertical plane relative to the container therebeneath, jaw means carried by each said chuck member for gripping the thus oriented closure elements, and means for moving each of said chuck members in a downward direction upon the gripping of the corresponding closure element by said jaw means, to thereby apply said corresponding element to its container.

6. A machine as defined in claim 5, in which the rotation of each of said closure elements is arrested with its lateral projection extending in a predetermined direction relative to the corresponding container.

7. A machine for applying closure elements to containers, each of said elements having a laterally extending projection thereon, said machine comprising, in combination, a rotary turret for receiving successive containers from a supply thereof, a plurality of vertically reciprocable chuck members mounted around said turret adjacent the periphery thereof and respectively positioned above and in substantial vertical alignment with the containers received thereby, twirling means carried by each of said chuck members and rotatably disposed with respect thereto, a source of said closure elements for said containers, a plurality of vertically reciprocable arm means, one for each chuck member, mounted on said turret for receiving successive closure elements from said source, means for rotating said turret, first operating means responsive to the rotation of said turret for moving each of said arm means in an upward direction relative to the corresponding chuck member to thereby position the closure element received by each said arm means in operative relationship with the twirling means carried by said corresponding member, means for rotating each of said twirling means relative to said turret to similarly rotate the closure element in operative relationship therewith, orienting means mounted on each of said chuck members for engaging the lateral projection on the corresponding closure element to thereby arrest the rotation thereof when its lateral projection reaches a predetermined vertical plane relative to the container therebeneath, jaw means carried by each said chuck member for gripping the thus oriented closure elements, and second operating means responsive to further rotation of said turret for moving each of said chuck members in a downward direction upon the gripping of the corresponding closure element by said jaw means, to thereby apply said corresponding element to its container.

8. A machine for applying closure elements to containers, each of said elements having a laterally extending projection thereon, said machine comprising, in combination, a rotary turret for receiving successive containers from a supply thereof, a plurality of vertically reciprocable chuck members mounted around said turret adjacent the periphery thereof, means for respectively positioning the containers received by said turret beneath said chuck members in substantial vertical alignment therewith, twirling means carried by each of said chuck members and rotatably disposed with respect thereto, a source of said closure elements for said containers, arm means movably mounted on said turret adjacent each of said chuck members for receiving one of the closure elements from said source, means for rotating said turret at a uniform speed, first operating means responsive to the rotation of said turret for moving each of said arm means relative thereto to thereby move the closure element received by each said arm means into engagement with the twirling means carried by the adjacent chuck member, means for rotating each of said twirling means relative to said turret to similarly rotate the closure element engaged thereby, means mounted on each of said chuck members for engaging the lateral projection on the corresponding closure element to thereby arrest the rotation thereof when its lateral projection reaches a predetermined vertical plane relative to the container therebeneath and for thereafter gripping the thus oriented closure element, and second operating means responsive to further rotation of said turret for moving each of said chuck members in a downward direction upon the gripping of the corresponding closure element by said last-mentioned means, to thereby apply said corresponding element to its container.

9. A machine for applying closure elements to containers, each of said elements having a laterally extending projection thereon, said machine comprising, in combination, a rotary turret for receiving successive containers from a supply thereof, a plurality of vertically reciprocable chuck members mounted around said turret adjacent the periphery thereof and respectively positioned above and in substantial vertical alignment with the containers received thereby, twirling means carried by each of said chuck members and rotatably disposed with respect thereto, a plurality of arm means, one for each of said chuck members, mounted on said turret, each of said arm means including an element receiving portion pivotally movable between two extreme positions about a vertical axis and also reciprocally movable therealong, said element receiving portion when in one of said positions being spaced laterally from the associated chuck member and the container therebeneath and when in the other of said positions being interposed therebetween, a source of said closure elements for said containers, means for positioning successive closure elements from said source on said element receiving portions, means for rotating said turret at a uniform speed, first operating means for controlling the pivotal movement of each of said receiving portions relative to said rotating turret between said positions, the closure element on each said portion being disposed in vertical alignment with the associated chuck member upon movement of the corresponding receiving portion from said one position to said other position, second operating means for controlling the reciprocable vertical movement of each of said receiving portions and of the chuck member associated therewith, the closure element on each said receiving portion engaging the twirling means carried by the associated chuck member upon upward movement of each said portion relative to said associated member, means for rotating each said twirling means to similarly rotate the closure element engaged thereby relative to said rotating turret, and means mounted on each of said chuck members for engaging the lateral projection on the corresponding closure element to thereby arrest the rotation thereof when its lateral projection reaches a predetermined vertical plane relative to the container therebeneath and for thereafter gripping the thus oriented closure element, said second operating means moving each of said chuck members in a downward direction upon the gripping of the corresponding closure element by said last-mentioned means, to thereby apply said corresponding element to its container.

10. A machine for applying closure elements to containers, each of said elements having a laterally extending projection thereon, said machine comprising, in combination, a rotary turret for receiving successive containers from a supply thereof, a plurality of vertically reciprocable chuck members mounted around said turret adjacent the periphery thereof and respectively positioned above and in substantial vertical alignment with the containers received thereby, twirling means carried by each of said chuck members and rotatably disposed with respect thereto, a source of said closure elements for said containers, a plurality of vertically reciprocable arm means, one for each of said chuck members, mounted on said turret, each of said arm means including a first portion for receiving one of the closure elements from said source and a second portion for engaging the container beneath the associated chuck member, means for rotating said turret, first operating means responsive to the rotation of said turret for controlling the reciprocable vertical movement of each of said arm means, the closure element received by each said first portions engaging the twirling means carried by the associated chuck member upon upward movement of each of said arm means relative to said associated member, means for rotating each of said twirling means relative to said turret to similarly rotate the closure element engaged thereby, orienting means mounted on each of said chuck members for engaging the lateral projection on the corresponding closure element to thereby arrest the rotation thereof when its lateral projection reaches a predetermined vertical plane relative to the container therebeneath, jaw means carried by each said chuck member for gripping the thus oriented closure elements, said first operating means being effective upon the gripping of each of said closure elements by said jaw means to move the second portion of the corresponding arm means downwardly into engagement with the container therebeneath to firmly hold the same in rigid relationship with said turret, and second operating means responsive to further rotation of said turret for moving each of said chuck members in a downward direction as its container is held in said rigid relationship, to thereby apply said corresponding element thereto.

11. A machine for applying closure elements to containers, each of said elements having a laterally extending projection thereon, said machine comprising, in combination, a rotary turret for receiving successive containers from a supply thereof, a plurality of vertically reciprocable chuck members mounted around said turret adjacent the periphery thereof, means for respectively positioning the containers received by said turret beneath said chuck members in substantial vertical alignment therewith, twirling means carried by each of said chuck members and rotatably disposed with respect thereto, a source of said closure elements for said containers, vertically reciprocable arm means mounted on said turret adjacent each of said chuck members, each of said arm means including a first portion for receiving one of the closure elements from said source and a second portion for engaging the container beneath the chuck member thereadjacent, means for rotating said turret at a uniform speed, first operating means responsive to the rotation of said turret for controlling the reciprocable vertical movement of each of said arm means, the closure element received by each of said first portions engaging the twirling means carried by the corresponding chuck member upon upward movement of each of said arm means relative to said corresponding member, means for rotating each of said twirling means to similarly rotate the closure element engaged thereby relative to said rotating turret, orienting means mounted on each of said chuck members for engaging the lateral projection on the corresponding closure element to thereby arrest the rotation thereof when its lateral projection reaches a predetermined vertical plane relative to the container therebeneath, means carried by each said chuck member for gripping the thus oriented closure elements, said first operating means being effective upon the gripping of each of said closure elements by said last-mentioned means to move the second portion of the associated arm means downwardly into engagement with the container therebeneath to thereby position the same in exact vertical alignment with the corresponding chuck member, and second operating means responsive to continued rotation of said turret for moving each of said chuck members in a downward direction as its container is positioned in said exact vertical alignment, to thereby apply said corresponding element thereto.

12. A machine for applying closure elements to containers, each of said elements having a laterally extending projection thereon, said machine comprising, in combination, a rotary turret for receiving successive containers from a supply thereof, a plurality of vertically reciprocable chuck members mounted around said turret adjacent the periphery thereof and respectively positioned above and in substantial vertical alignment with the containers received thereby, twirling means carried by each of said chuck members and rotatably disposed with respect thereto, a plurality of vertically reciprocable shafts, one for each of said chuck members, supported adjacent the periphery of said turret, a source of said closure elements for said containers, arm means affixed to the lower end of each of said shafts and including a first portion for receiving one of the closure elements from said source and a second portion for engaging the container beneath the associated chuck member, means for rotating said turret at a uniform speed, first operating means responsive to the rotation of said turret for controlling the reciprocable vertical movement of each of said shafts and its arm means, the closure element received by each of said first portions engaging the twirling means carried by the associated chuck member upon upward movement of each of said arm means relative to said corresponding member, means for rotating each said twirling means to similarly rotate the closure element engaged thereby relative to said rotating turret, orienting means mounted on each of said chuck members for engaging the lateral projection on the corresponding closure element to thereby arrest the rotation thereof when its lateral projection reaches a predetermined vertical plane relative to the container therebeneath, jaw means carried by each said chuck member for gripping the thus oriented closure elements, said first operating means being effective upon the gripping of each of said closure elements by said jaw means to move each of said shafts in a downward direction, the second portion of the attached arms means engaging the container therebeneath during said downward movement to position the same in exact vertical alignment with the associated chuck member, and second operating means responsive to continued rotation of said turret for moving each of said chuck members downwardly as its container is positioned in said exact vertical alignment, to thereby apply said corresponding element thereto.

13. A machine for applying closure elements to containers, each of said elements having a laterally extending projection thereon, comprising, in combination, a rotary turret for receiving successive containers from a supply thereof, a plurality of vertically reciprocable chuck members mounted around said turret adjacent the periphery thereof, means for respectively positioning the containers received by said turret beneath said chuck members in substantial vertical alignment therewith, an elongated plunger carried by each of said chuck members and rotatably disposed with respect thereto, a plurality of vertically disposed rock shafts, one for each of said chuck members, mounted adjacent the periphery of said turret, a source of said closure elements for said containers, arm means affixed to the lower end of each of said rock shafts for receiving one of the closure elements from said source, means for rotating said turret at a uniform speed, first operating means responsive to the rotation of said turret for moving each of said rock shafts relative thereto to move the closure element received by the corresponding arm means into engagement with the plunger carried by the associated chuck member, means for rotating each said plunger relative to said turret to similarly rotate the closure element engaged thereby, means mounted on each of said chuck members for engaging the lateral projection on the corresponding closure element to thereby arrest the rotation thereof when its lateral projection reaches a predetermined vertical plane relative to the container therebeneath and for thereafter gripping the oriented closure element, and second operating means responsive to further rotation of said turret for moving each of said chuck members in a downward direction, to thereby apply the corresponding closure element to its container.

14. A machine for applying closure elements to containers, each of said closure elements having a laterally extending projection thereon, comprising, in combination, a rotary turret for receiving successive containers from a supply thereof and respectively positioned above and in substantial vertical alignment with the containers received thereby, twirling means carried by each of said chuck members and rotatably disposed with respect thereto, a plurality of vertically disposed rock shafts, one for each of said chuck members, reciprocably mounted adjacent the periphery of said turret, a source of said closure elements for said containers, arm means affixed to the lower end of each of said rock shafts for receiving one of the closure elements from said source, means for rotating said turret at a uniform speed, first operating means responsive to the rotation of said turret for pivoting each of said rock shafts about its axis to thereby position the closure element received by the corresponding arm means beneath the chuck member associated therewith, second operating means responsive to continued rotation of said turret for moving each of said shafts and its arm means in an upward direction relative to the associated chuck member and for thereafter moving each said shaft, its arm means and the associated chuck member in a downward direction toward the container therebeneath, the closure element on each said arm means frictionally engaging the twirling means carried by the corresponding chuck member during said upward relative movement, means for rotating each said twirling means to similarly rotate the closure element engaged thereby, and orienting means mounted on each of said chuck members for engaging the lateral projection on the corresponding closure element to thereby arrest the rotation thereof when its lateral projection reaches a predetermined vertical plane relative to the container therebeneath, the associated chuck member thereafter gripping the oriented closure element and, as said associated chuck member is moved downwardly by said second operating means, applying said oriented element to its container.

15. A machine for applying closure elements to containers, each of said closure elements having a laterally extending projection thereon, comprising, in combination, a rotary turret for receiving successive containers from a supply thereof, a plurality of vertically reciprocable chuck members mounted around said turret adjacent the periphery thereof, means for respectively positioning the containers received by said turrent beneath said chuck members in substantial vertical alignment therewith, twirling means carried by each of said chuck members and rotatably disposed with respect thereto, a plurality of vertically disposed rock shafts, one for each of said chuck members, reciprocably mounted adjacent the periphery of said turrent, a source of said closure elements for said containers, an arm member affixed to the lower end of each of said rock shafts and including a first portion for receiving one of the closure elements from said source and a second portion for engaging the container beneath the associated chuck member, means for rotating said turret, first operating means responsive to the rotation of said turret for pivoting each of said rock shafts about its axis, pivotal movement of each said rock shaft in one direction positioning the closure element received by the first portion of the corresponding arm member beneath the chuck member associated therewith, pivotal movement of each said shaft in the opposite direction moving the second arm portion of said corresponding arm member between the associated chuck member and the container therebeneath, second operating means responsive to continued rotation of said turret for moving each of said shafts and its arm member in an upward direction relative to the associated chuck member and for thereafter moving each said shsaft, its arm member and the associated chuck member in a downward direction toward the container therebeneath, the closure element on the first portion of each said arm member frictionally engaging the twirling means carried by the corresponding chuck member during said upward relative movement, means for rotating each said twirling means to similarly rotate the closure element engaged thereby, orienting means mounted on each of said chuck members for engaging the lateral projection on the corresponding closure element to thereby arrest the rotation thereof when its lateral projection reaches a predetermined vertical plane relative to the container therebeneath, and jaw means mounted on the associated chuck member for thereafter gripping the oriented closure element, said first operating means being effective upon the gripping of each of said elements to pivot the adjacent rock shaft in said opposite direction as said adjacent shaft, its arm member and the associated chuck member are moved downwardly by said second operating means, the second portion of each said arm member engaging the container therebeneath during said downward movement to position the same in exact vertical alignment with the associated chuck member and said associated chuck member thereafter applying the corresponding element to the thus aligned container.

16. In a machine for applying a closure element to a container, said closure element having a laterally extending projection thereon, the combination of a vertically reciprocable chuck member disposed in substantial vertical alignment with said container, a support for said chuck member, means carried by said support for positioning said closure element between said chuck member and said container, means responsive to said last-mentioned means for orienting said closure element, with the lateral projection on said closure element extending in a predetermined vertical plane relative to the container therebeneath, means operatively associated with said chuck member for gripping the thus oriented closure element, and means for thereafter moving said chuck member toward said container to apply the oriented closure element thereto.

17. In a machine for applying a closure element to a container, said closure element having a laterally extending projection thereon, the combination of a vertically reciprocable chuck member disposed above said container in substantial vertical alignment therewith, a support for said chuck member, means carried by said support for positioning said closure element between said chuck member and said container, means responsive to said last-mentioned means for rotating said closure element, orienting means operable in response to the rotation of said closure element for engaging the lateral projection thereon to thereby arrest the rotation thereof when said projection reaches a predetermined vertical plane relative to the container therebeneath, means mounted on said chuck member for gripping the thus oriented closure element, and means for thereafter moving said chuck member in a downward direction to apply the oriented closure element to said container.

18. In a machine for applying a closure element to a container, said closure element having a laterally extending projection thereon, the combination of a vertically reciprocable chuck member disposed above said container in substantial vertical alignment therewith, said chuck member including a pair of element receiving jaws thereon, a support for said chuck member, means carried by said support for positioning said closure element between said chuck member and said container, orienting means responsive to said last-mentioned means and including said jaws for arranging said closure element with the lateral projection thereon extending in a predetermined vertical plane relative to the container therebeneath, said jaws thereafter gripping the thus oriented closure element, and means for moving said chuck member in a downward direction to apply the oriented closure element to said container.

19. In a machine for applying a closure element to a container, said closure element having a laterally extending projection thereon, the combination of a vertically reciprocable chuck member including a pair of element receiving jaws thereon disposed above said container in substantial vertical alignment therewith, said jaws being positioned in spaced apart relationship with each other to provide an opening therebetween and oriented relative to said container so that said opening is disposed above a selected portion thereof, a support for said member, means carried by said support for positioning said closure element in juxtaposition with said jaws with the lateral projection thereon extending in said opening, to thereby orient said element with said projection disposed above the selected portion of said container in a predetermined vertical plane relative thereto, said jaws thereafter gripping the thus oriented closure element, and means for moving said chuck member in a downward direction to apply the oriented closure element to said container.

20. In a machine for applying a closure element to a container, said closure element having a laterally extending projection thereon, the combination of a vertically reciprocable chuck member including a pair of element receiving jaws disposed above said container in substantial vertical alignment therewith, a support for said chuck member, means carried by said support for receiving said closure element from a supply thereof and locating the same between said chuck member and said container, means responsive to said last-mentioned means for rotating said closure element, vertically movable means operable in response to the rotation of said closure element for positioning said element in juxtaposition with said chuck member, the lateral projection on said closure element engaging a portion of said chuck member to thereby arrest the rotation of said element when said projection reaches a predetermined vertical plane relative to the container therebeneath, said jaws thereafter gripping said closure element, and means for moving said chuck member in a downward direction to apply the thus gripped closure element to said container.

21. In a machine for applying a closure element to a container, said closure element having a laterally extending projection thereon, the combination of a vertically reciprocable chuck member having a depending portion thereon and including a pair of element receiving jaws disposed above said container in substantial vertical alignment therewith, a support for said chuck member, arm means carried by said support for receiving said closure element from a supply thereof and locating the same between said chuck member and said container in vertical alignment therewith, means responsive to said last-mentioned means for rotating said closure element, vertically movable means operable in response to the rotation of said closure element for positioning said element in juxtaposition with said chuck member, the lateral projection on said closure element engaging the depending portion of said chuck member to thereby arrest the rotation of said element when said projection reaches a predetermined vertical plane relative to the container therebeneath and is oriented in a given direction in said plane, said jaws thereafter gripping the thus oriented closure element, and means for moving said chuck member in a downward direction to apply the closure element gripped by said jaws to said container.

22. In a machine as defined in claim 21, said vertically movable means including means for moving said rotating closure element in an upward direction toward said chuck member, to thereby position the depending portion of said member in the path of the lateral projection on said rotating element.

23. In a machine for applying a closure element to a container, said closure element having a laterally extending projection thereon, the combination of a vertically reciprocable chuck member including a pair of element receiving jaws thereon disposed above said container in substantial vertical alignment therewith, said jaws being positioned in spaced-apart relationship with each other to provide an opening therebetween and oriented relative to said container so that said opening is disposed above a selected portion thereof, a support for said chuck member, means carried by said support for receiving said closure element from a supply thereof and locating the same between said chuck member and said container, in vertical alignment therewith, means responsive to said last-mentioned means for rotating said closure element, vertically movable means operable in response to the rotation of said closure element for positioning said element in juxtaposition with said chuck member with the lateral projection on said element extending in the opening between said jaws, said projection engaging one of said jaws to thereby arrest the rotation of said element when said projection reaches a predetermined vertical plane relative to the container therebeneath, said jaws thereafter gripping said closure element, and means for moving said chuck member in a downward direction to apply the thus gripped closure element to said container.

24. In a machine as defined in claim 23, said vertically movable means including means for moving said chuck member downwardly toward said rotating closure element, to thereby position the lateral projection thereon in the opening between said jaws.

25. In a machine for applying a closure element to a container, said closure element having a laterally extending projection thereon, the combination of a vertically reciprocable chuck member including a pair of element receiving jaws thereon disposed above said container in substantial vertical alignment therewith, a support for said chuck member, twirling means carried by said chuck member and rotatably disposed with respect thereto, means mounted on said support and including an arm portion for receiving said closure element from a supply thereof and moving the same into engagement with said twirling means, means for rotating said twirling means to thereby rotate the closure element engaged thereby, orienting means operatively associated with said chuck member and responsive to the rotation of said closure element for engaging the lateral projection thereon to arrest the rotation thereof when said projection reaches a predetermined vertical plane relative to the container therebeneath, said jaws thereafter gripping the thus oriented closure element, and means for moving said chuck member in a downward direction to apply the thus gripped closure element to said container.

26. In a machine for applying a closure element to a container, said closure element having a laterally extending projection thereon, the combination of a vertically reciprocable chuck member disposed above said container in substantial vertical alignment therewith, a support for said chuck member, twirling means carried by said chuck member and rotatably disposed with respect thereto, means positioned on said support adjacent said chuck member and including a vertically reciprocable arm portion thereon for receiving said closure element from a supply thereof and locating the same between said chuck member and said container in vertical alignment therewith, operating means for controlling the vertical reciprocable movement of said arm portion and of said chuck member, the closure element received by said arm portion engaging the twirling means carried by said chuck member upon upward movement of said arm portion relative to said member, means for rotating said twirling means to thereby rotate said closure element, orienting means mounted on said chuck member for engaging the lateral projection on said closure element to arrest the rotation thereof when said projection reaches a predetermined vertical plane relative to said container, and means supported by said chuck member for gripping the thus oriented closure element, said operating means thereafter moving said chuck member in a downward direction to apply said closure element to said container.

27. In a machine for applying a closure element to a container, said closure element having a laterally extending projection thereon, the combination of a vertically reciprocable chuck member disposed above said container in substantial vertical alignment therewith, a support for said chuck member, twirling means carried by said chuck member and rotatably disposed with respect thereto, arm means positioned on said support adjacent said chuck member and including an element receiving portion movable between two extreme positions, said element receiving portion when in one of said positions being spaced laterally from said chuck member and said container and when in the other of said positions being disposed in juxtaposition with said twirling means, means for positioning said closure element on said receiving portion when said portion is in said one position, first operating means for controlling the movement of said element receiving portion between said position, said closure element being disposed in frictional engagement with the twirling means on said chuck member upon movement of said receiving portion from said one position to said other position, means for rotating said twirling means to thereby rotate said closure element, orienting means mounted on said chuck member for engaging the lateral projection on said closure element to arrest the rotation thereof when said projection reaches a predetermined vertical plane relative to the container therebeneath, means supported by said chuck member for gripping the thus oriented closure element, and second operating means for thereafter moving said chuck member in a downward direction to apply said closure element to said container.

28. In a machine for applying a closure element to a container, said closure element having a laterally extending projection thereon, the combination of a vertically reciprocable chuck member disposed above said container in substantial vertical alignment therewith, said chuck member including a pair of element receiving jaws thereon, a support for said chuck member, an elongated plunger carrier by said chuck member and rotatably disposed with respect thereto, arm means positioned on said support adjacent said chuck member and including an element receiving portion pivotally movable between two extreme positions about a vertical axis and also reciprocably movable therealong, said element receiving portion when in one of said position being spaced laterally from said chuck member and said container and when in the other of said positions being interposed therebetween, means for positioning said closure element on said receiving portion when in its said one position, first operating means for controlling the pivotal movement of said receiving portion between said positions, said closure element being disposed in vertical alignment with said chuck member and said container upon movement of said receiving portion from said one position to said other position, second operating means for controlling the reciprocable vertical movement of said receiving portion and of said chuck member, the closure element on said receiving portion engaging the plunger carried by said chuck member upon upward movement of said portion relative to said member, means for rotating said plunger to similarly rotate said closure element, and orienting means mounted on said chuck member for engaging the lateral projection on said closure element to thereby arrest the rotation thereof when said projection reaches a predetermined vertical plane relative to said container, the jaws of said chuck member gripping the thus oriented closure element therebetween, said first operating means thereafter returning said element receiving portion to said one position and said second operating means moving said chuck member in a downward direction to apply the oriented closure element to said container.

29. In a capping machine for applying a cap to a container having a cap receiving opening therein, a vertically reciprocable chuck member disposed above said container in substantial vertical alignment therewith, said chuck member having a pair of cap receiving jaws pivotally supported in spaced-apart relationship with each other and spring means biasing said jaws toward their closed position, a support for said chuck member, twirling means carried by said chuck member and rotatably disposed with respect thereto, means positioned on said support adjacent said chuck member and including an arm portion pivotally movable between two extreme positions about a vertical axis and also reciprocably movable therealong, said arm portion when in one of said positions being laterally spaced from said chuck member and said container and when in the other of said positions being interposed therebetween, means for positioning a container cap having a laterally extending projection thereon on said arm portion when in its said one position, first operating means for controlling the pivotal movement of said arm portion between said positions, the cap on said arm portion being disposed in vertical alignment with said chuck member and said container upon movement of said arm portion from said one position to said other position, second operating means for controlling the reciprocable vertical movement of said arm portion and of said chuck member, the cap on said arm portion engaging the twirling means carried by said chuck member upon upward movement of said portion relative to said member, means for rotating said twirling means to similarly rotate said cap, and orienting means mounted on said chuck member for engaging the lateral projection on said cap to thereby arrest the rotation thereof when said projection reaches a predetermined vertical plane relative to said container, said second operating means lowering said chuck member to move the jaws thereon into engagement with the thus oriented cap, said jaws pivoting to receive said cap and thereafter returning to their closed position in response to said spring means to firmly grip said cap therebetween, the oriented cap gripped by said jaws being inserted in the opening in said container upon continued downward movement of said chuck member, said first operating means returning said arm portion to its said one position during said continued downward movement.

30. In a machine as defined in claim 29, said jaws being supported on said chuck member for reciprocable vertical movement with respect thereto, said spring means urging said jaws in a downward direction toward said container.

31. In a capping machine for applying a cap to a container having a cap receiving opening therein, a vertically reciprocable chuck member disposed above said container in substantial vertical alignment therewith, said chuck member including a pair of cap receiving jaws thereon, a support for said chuck member, twirling means carried by said chuck member and rotatably disposed with respect thereto, arm means positioned on said support adjacent said chuck member, said arm means being pivotally movable about a vertical axis and also reciprocably movable therealong, said arm means including a first portion for receiving a container cap from a supply thereof and a second diverging portion having a container engaging lug depending therefrom, said cap having at least one laterally extending projection thereon, first operating means for controlling the pivotal movement of said arm means, pivotal movement of said arm means in one direction positioning the cap received by said first portion between said chuck member and said container in vertical alignment with the opening therein, pivotal movement of said arm means in the opposite direction moving said second portion between said chuck member and said container, second operating means for controlling the reciprocable vertical movement of said arm means and of said chuck member, the cap on said first portion engaging the twirling means carried by said chuck member upon pivotal movement of said arm means in said one direction and upon upward movement thereof relative to said member, means for rotating said twirling means to similarly rotate said cap, and orienting means mounted on said chuck member for engaging the lateral projection on said cap to thereby arrest the rotation thereof when said projection reaches a predetermined vertical plane relative to said container, the jaws of said chuck member gripping the thus oriented closure element therebetween, said first operating means thereafter pivoting said arm means in said opposite direction to position the second portion thereof between said chuck member and said container, said second operating means lowering said arm means and said chuck member to move the lug on the second portion of said arm means into engagement with said container and to insert the cap gripped by said jaws into said container opening.

32. In a capping machine for applying a cap to a container having a cap receiving opening therein, a vertically reciprocable chuck member disposed above said container in substantial vertical alignment therewith, said chuck member including a pair of cap receiving jaws thereon, a support for said chuck member, twirling means carried by said chuck member and rotatably disposed with respect thereto, a vertically disposed rock shaft reciprocally mounted on said support adjacent said chuck member, an arm member affixed to the lower end of said shaft and including a first portion for receiving a container cap from a supply thereof and a second diverging portion having a container engaging lug depending therefrom, said cap having a laterally extending projection thereon, first operating means for pivoting said rock shaft about its axis, pivotal movement of said shaft in one direction positioning the cap received by the first portion of said arm member between said chuck member and said container in vertical alignment with said cap receiving opening, pivotal movement of said shaft in the opposite direction moving the second portion of said arm member between said chuck member and said container, second operating means for controlling the reciprocable vertical movement of said rock shaft, its arm member and said chuck member, the cap on the first portion of said arm member engaging the twirling means carried by said chuck member upon pivotal movement of said shaft in said one direction and upon upward movement thereof relative to said chuck member, means for rotating said twirling means to similarly rotate said cap, and orienting means mounted on said chuck member for engaging the lateral projection on said cap to thereby arrest the rotation thereof when said projection reaches a predetermined vertical plane relative to the container therebeneath, the jaws of said chuck member gripping the thus oriented closure element therebetween, said first operating means thereafter pivoting said rock shaft in said opposite direction to position the second portion of said arm member between said chuck member and said container, said second operating means lowering said rock shaft, its arm member and said chuck member to move the lug on the second portion of said arm means into engagement with said container and to insert the cap gripped by said jaws into said container opening, said lug firmly holding said container in fixed relationship with said arm member as the cap is inserted in said opening.

33. In a capping machine as defined in claim 32, said twirling means being movable in a vertical direction relative to said chuck member and including a foot portion at the lower end thereof, said foot portion being interposed between said jaws when said chuck member is in its lowermost position and protruding therebeneath when said chuck member is in its uppermost position.

References Cited in the file of this patent
UNITED STATES PATENTS

| | | |
|---|---|---|
| 1,797,679 | Clark | Mar. 24, 1931 |
| 2,962,846 | Marindin | Dec. 6, 1960 |